(12) United States Patent
Eckel et al.

(10) Patent No.: US 12,695,001 B2
(45) Date of Patent: Jul. 28, 2026

(54) PHOTONICALLY MULTIPLEXED OPTICAL MEASUREMENT APPARATUS AND PERFORMING OPTICAL MULTIPLEXING

(71) Applicant: Government of the United States of America, as represented by the Secretary of Commerce, Gaithersburg, MD (US)

(72) Inventors: Stephen Paul Eckel, Rockville, MD (US); Daniel Schaeder Barker, Olney, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 412 days.

(21) Appl. No.: 18/141,711

(22) Filed: May 1, 2023

(65) Prior Publication Data

US 2023/0360817 A1    Nov. 9, 2023

Related U.S. Application Data

(60) Provisional application No. 63/338,047, filed on May 4, 2022.

(51) Int. Cl.
| | |
|---|---|
| *G21K 1/30* | (2026.01) |
| *G01L 21/00* | (2006.01) |
| *G01P 15/00* | (2006.01) |
| *G01V 7/00* | (2006.01) |
| *G04F 5/14* | (2006.01) |

(52) U.S. Cl.
CPC ................ *G21K 1/30* (2026.01); *G01L 21/00* (2013.01); *G01P 15/00* (2013.01); *G01V 7/00* (2013.01); *G04F 5/14* (2013.01)

(58) Field of Classification Search
CPC ......... G21K 1/006; G01L 21/00; G01P 15/00; G01P 15/093; G01V 7/00; G04F 5/14
See application file for complete search history.

(56) References Cited

U.S. PATENT DOCUMENTS

| | | | | |
|---|---|---|---|---|
| 8,803,072 B2 | 8/2014 | Booth et al. | | |
| 11,291,103 B2 | 3/2022 | Eckel et al. | | |
| 2007/0024857 A1* | 2/2007 | Menezo | ................ | G01H 9/004 |
| | | | | 385/12 |
| 2014/0016118 A1* | 1/2014 | Compton | ............... | G01C 19/58 |
| | | | | 356/72 |
| 2023/0197308 A1* | 6/2023 | Black | .................... | G01C 19/58 |
| | | | | 250/505.1 |

* cited by examiner

*Primary Examiner* — Xin Y Zhong
(74) *Attorney, Agent, or Firm* — Office of Chief Counsel for National Institute of Standards and Technology

(57) ABSTRACT

A photonically multiplexed optical measurement apparatus for performing optical multiplexing includes a laser that produces laser light, an optical switch that receives the laser light from the laser and produces a switched laser light, and a plurality of sensor heads, each sensor head being configured to measure a respective physical property of a plurality of cold atoms disposed in the sensor head. The optical switch optically switches the laser light from the laser to a selected sensor head and subsequently to a different sensor head.

20 Claims, 13 Drawing Sheets

200

PHOTONICALLY MULTIPLEXED OPTICAL MEASUREMENT APPARATUS AND PERFORMING OPTICAL MULTIPLEXING

CROSS REFERENCE TO RELATED APPLICATIONS

This application claims the benefit of U.S. Provisional Patent Application Ser. No. 63/338,047 (filed May 4, 2022), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is a photonically multiplexed optical measurement apparatus for performing optical multiplexing, the photonically multiplexed optical measurement apparatus comprising: a first laser that produces first laser light and communicates the first laser light to a first optical switch; the first optical switch in optical communication with the first laser and that: receives the first laser light from the first laser, produces a first switched laser light from the first laser light with the first optical switch in a first switch state, communicates the first switched laser light to a first sensor head during the first switch state, switches from the first switch state to a second switch state, produces a second switched laser light from the first laser light with the first optical switch in a second switch state, and communicates the second switched laser light to a second sensor head during the second switch state, such that the first optical switch optically switches the first laser light from the first laser to a selected sensor head and subsequently to a different sensor head; and a plurality of sensor heads, each sensor head being configured to measure a respective physical property of a plurality of cold atoms disposed in the sensor head, such that the plurality of sensor heads comprises the first sensor head and the second sensor head.

Disclosed is a photonically multiplexed optical measurement apparatus comprising: a laser for producing laser light; an optical switch in optical communication with the laser and configured to optically switch the laser light to a selected sensor head; a plurality of sensor heads, each sensor head being configured to measure a respective physical property of a plurality of cold atoms disposed in the sensor head; and a controller configured to control the optical switch to optically switch the laser light to the plurality of sensor heads in a sequence.

Disclosed is a process of operating a photonically multiplexed optical measurement apparatus, comprising: providing a photonically multiplexed optical measurement apparatus comprising: a laser for producing laser light; an optical switch in optical communication with the laser and configured to optically switch the laser light to a selected sensor head; a plurality of sensor heads, each sensor head being configured to measure a respective physical property of a plurality of cold atoms disposed in the sensor head; and a controller configured to control the optical switch to optically switch the laser light to the plurality of sensor heads in a sequence; selecting a sensor head from the plurality of sensor heads; providing, by the optical switch, switched laser light to the selected sensor head; measuring the property of cold atoms using the selected sensor head; and turning off, by the optical switch, the switched laser light to the selected sensor head.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

Figure 1:
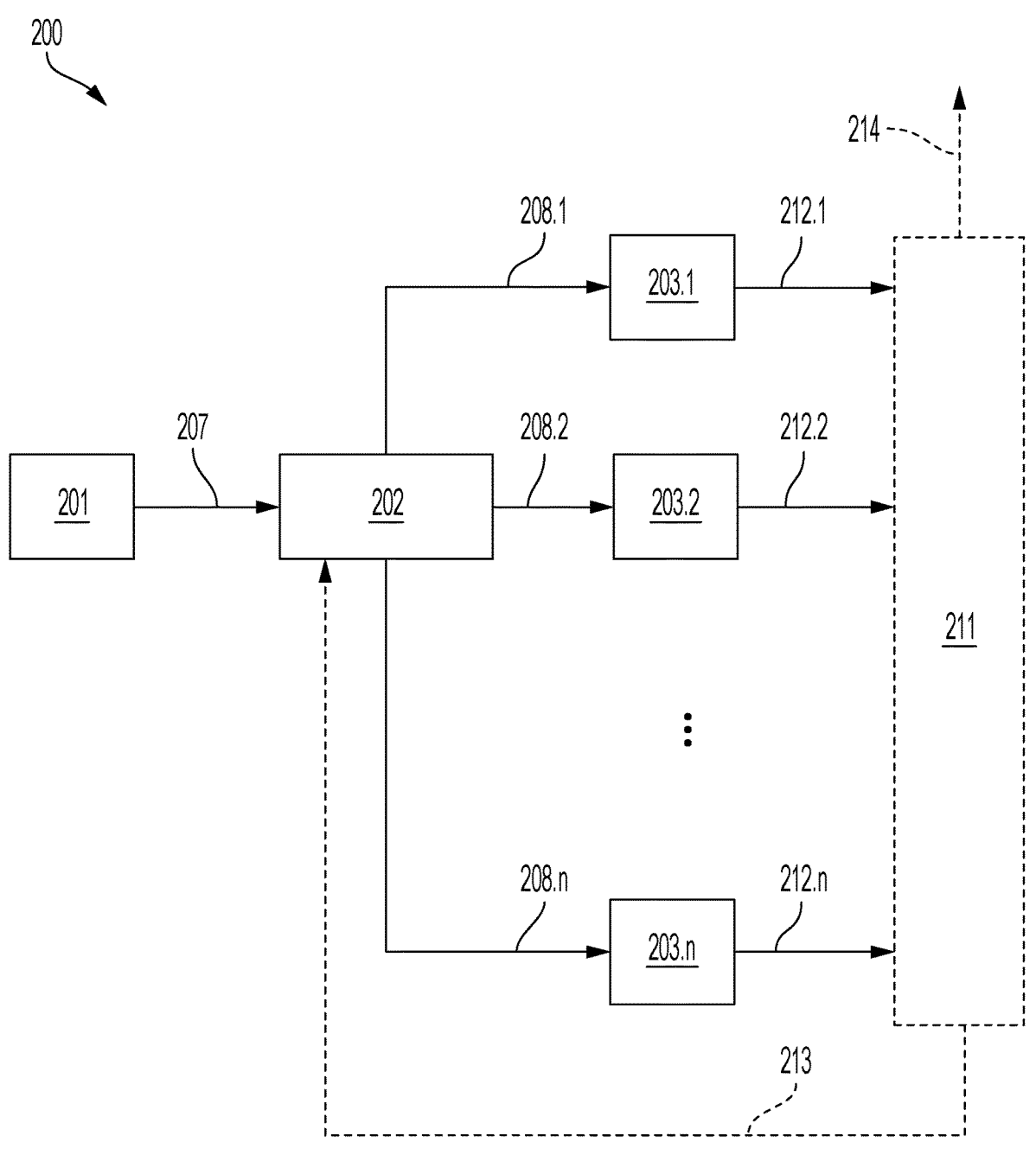
FIG. 1 shows, according to some embodiments, a photonically multiplexed optical measurement apparatus.

1, with the latter's titanium shutter closed (downward triangles) or open (upward triangles). Curves are exponential functions fit to the data.

DETAILED DESCRIPTION

A detailed description of one or more embodiments is presented herein by way of exemplification and not limitation.

Cold atom devices are a class of quantum sensors that use laser cooling and trapping to cool atoms to very low temperatures. This allows the atoms to be confined in a small volume and their quantum state to be accurately controlled, making them very sensitive to external perturbations. Cold atom devices have been used to measure a variety of properties, including vacuum pressure, inertial forces, gravitational acceleration, and time. A challenge for cold atom devices is that cold atom devices can be expensive to build and operate because they require specialized equipment, such as lasers and vacuum chambers. Another challenge is that inconsistencies between laser setups used to confine, to manipulate, and to probe the atoms leads to uncertainties from device to device. One way to address these challenges is to use a single laser to operate multiple cold atom devices in the same laboratory setup. This has several advantages; it reduces the per-unit cost of the devices, as only one laser is needed; and it makes it easier to control the atoms, as they are all being affected by the same laser field.

Using a single laser to operate multiple cold atom devices can overcome the challenges associated with using cold atom devices. This approach can make cold atom devices more affordable, more reliable, and easier to use. Using a single laser to operate multiple cold atom devices reduces cost as only one laser is involved, which can save a significant amount of money; and allows simpler control because atoms are all being affected by the same laser field, which makes it easier to control their behavior and can lead to more precise data. As a result, using a single laser to operate multiple cold atom devices can improve the performance and affordability of cold atom devices.

Moreover, a shared laser that provides laser light to a plurality of cold atom devices can be used in cooling, trapping, and interferometry with a plurality of cold atom devices. Advantages of using a shared laser to provide laser light to a plurality of cold atom devices include cost savings wherein a shared laser is typically less expensive than multiple lasers; reduced complexity wherein a shared laser is easier to install, operate, and maintain than multiple lasers; improved performance wherein a shared laser can be optimized for a particular application, which can lead to improved performance of the cold atom devices; increased flexibility wherein a shared laser can be used to operate multiple cold atom devices, which can increase the flexibility of the experimental setup. In addition to these advantages, using a shared laser can reduce the environmental impact of cold atom experiments because a shared laser typically consumes less power than multiple lasers.

The photonically multiplexed optical measurement apparatus described herein overcomes a number of technical deficiencies of conventional cold atom measurement devices. The photonically multiplexed optical measurement apparatus is more efficient because the sensor heads can be multiplexed in time or in wavelength, which allows sharing a laser by multiple sensor heads. The photonically multiplexed optical measurement apparatus is more compact because the sensor heads and laser can be integrated into a single device. The photonically multiplexed optical measurement apparatus is more versatile because the sensor heads can be configured to measure a variety of properties of cold atoms.

The photonically multiplexed optical measurement apparatus includes a plurality of sensor heads, each of which is configured to measure a selected property of cold atoms. The sensor heads can include, for example, atom interferometers, vacuum pressure sensors, and inertial sensors. The sensor heads are optically coupled to a shared laser. The shared laser can be, for example, a single-frequency laser, tunable laser, or broadband laser. An optical switch can be configured to switch the shared laser such that the sensor heads are multiplexed in time or in wavelength.

In an embodiment, the sensor heads are multiplexed in time. Here, the optical switch is configured to turn on and off the laser light in a sequence such that each sensor head is only turned on for a short period of time. This allows the sensor heads to be multiplexed without significantly affecting the measurement accuracy.

In an embodiment, the sensor heads are multiplexed in wavelength. In this embodiment, a controller is configured to tune various shared lasers to different wavelengths. This allows the sensor heads to be multiplexed without significantly affecting the measurement range.

The photonically multiplexed optical measurement apparatus can be used to measure a variety of properties of cold atoms. For example, the photonically multiplexed optical measurement apparatus can be used to measure vacuum pressure, inertial forces, gravitational acceleration, and time and frequency. The photonically multiplexed optical measurement apparatus can also be used to measure other properties of cold atoms, such as the temperature, the density, and associated quantum-mechanical phases.

It has been discovered that a photonically multiplexed optical measurement apparatus 200 operates using the same laser or set of lasers by a plurality of sensor heads 203. Accordingly, photonically multiplexed optical measurement apparatus 200 provides sharing of an expensive resource, typically the laser, amongst multiple sensor heads 203 and is a cost saver. Sensor head 203 can be a self-contained apparatus that produces atoms at a vacuum pressure for laser cooling, contains hardware necessary to cool the atoms except laser light source, and manipulates the atoms for measurement of a particular physical property. Exemplary sensor heads 203 for photonically multiplexed optical measurement apparatus 200 include cold atom vacuum gauges, atom interferometers, and the like that are multiplexed using a suitable configuration.

Photonically multiplexed optical measurement apparatus 200 can include various physical configurations of a laser system, optical switch 202, and a plurality of sensor heads 203 such as a plurality of portable cold-atom vacuum standards (pCAVS). In certain embodiments, processes for performing optical multiplexing with photonically multiplexed optical measurement apparatus 200 include reading out the pressure measured by each pCAVS with the laser system.

Lasers tend to be the major cost-driver for cold-atom-based devices and sensor heads (such as a pCAVS), so operating multiple sensor heads with the same laser system can be a major cost saver. Here, a pCAVS is a device that uses a single laser beam to load atoms into a magnetic trap, hold them for some variable measurement time as described in U.S. Pat. No. 8,803,072, which is incorporated by reference herein in its entirety, and then uses the same laser to count the remaining atoms. Repeating this pCAVS operation several times measures the lifetime of the atoms in the trap, which can then be transformed into vacuum pressure as described in U.S. Pat. No. 8,803,072.

Photonically multiplexed optical measurement apparatus 200 performs optical multiplexing. In an embodiment, with reference to FIG. 1, FIG. 2, FIG. 3, FIG. 4, FIG. 5, FIG. 6, FIG. 7, FIG. 8, FIG. 9, and FIG. 10, photonically multiplexed optical measurement apparatus 200 includes: first laser 201.1 that produces first laser light 207.1 and communicates first laser light 207.1 to first optical switch 202.1; first optical switch 202.1 in optical communication with first laser 201.1 and that: receives first laser light 207.1 from first laser 201.1, produces first switched laser light 208.1 from first laser light 207.1 with first optical switch 202 in first switch state 210.1, communicates first switched laser light 208.1 to first sensor head 203.1 during first switch state 210.1, switches from first switch state 210.1 to second switch state 210.2, produces second switched laser light 208.2 from first laser light 207.1 with first optical switch 202.1 in second switch state 210.2, and communicates second switched laser light 208.2 to second sensor head 203.2 during second switch state 210.2, such that first optical switch 202.1 optically switches first laser light 207.1 from first laser 201.1 to a selected sensor head and subsequently to a different sensor head; and a plurality of sensor heads 203, each sensor head 203 being configured to measure a respective physical property of a plurality of cold atoms disposed in sensor head 203, such that the plurality of sensor heads 203 includes first sensor head 203.1 and second sensor head 203.2.

In an embodiment, photonically multiplexed optical measurement apparatus 200 includes control unit 211 that: receives a plurality of measurement signals 212 from the plurality of sensor heads 203 in response to individual sensor heads 203 receiving switched laser light 208; controls, by control signal 213, first optical switch 202.1 to optically switch first laser light 207.1 from first laser 201.1 to selected sensor head 203 in accordance with the plurality of measurement signals 212; measures the respective physical property of the selected sensor head 203 using switched laser light 208; and generates a plurality of measurement outputs 214 based on the measured physical properties.

Figure 6:
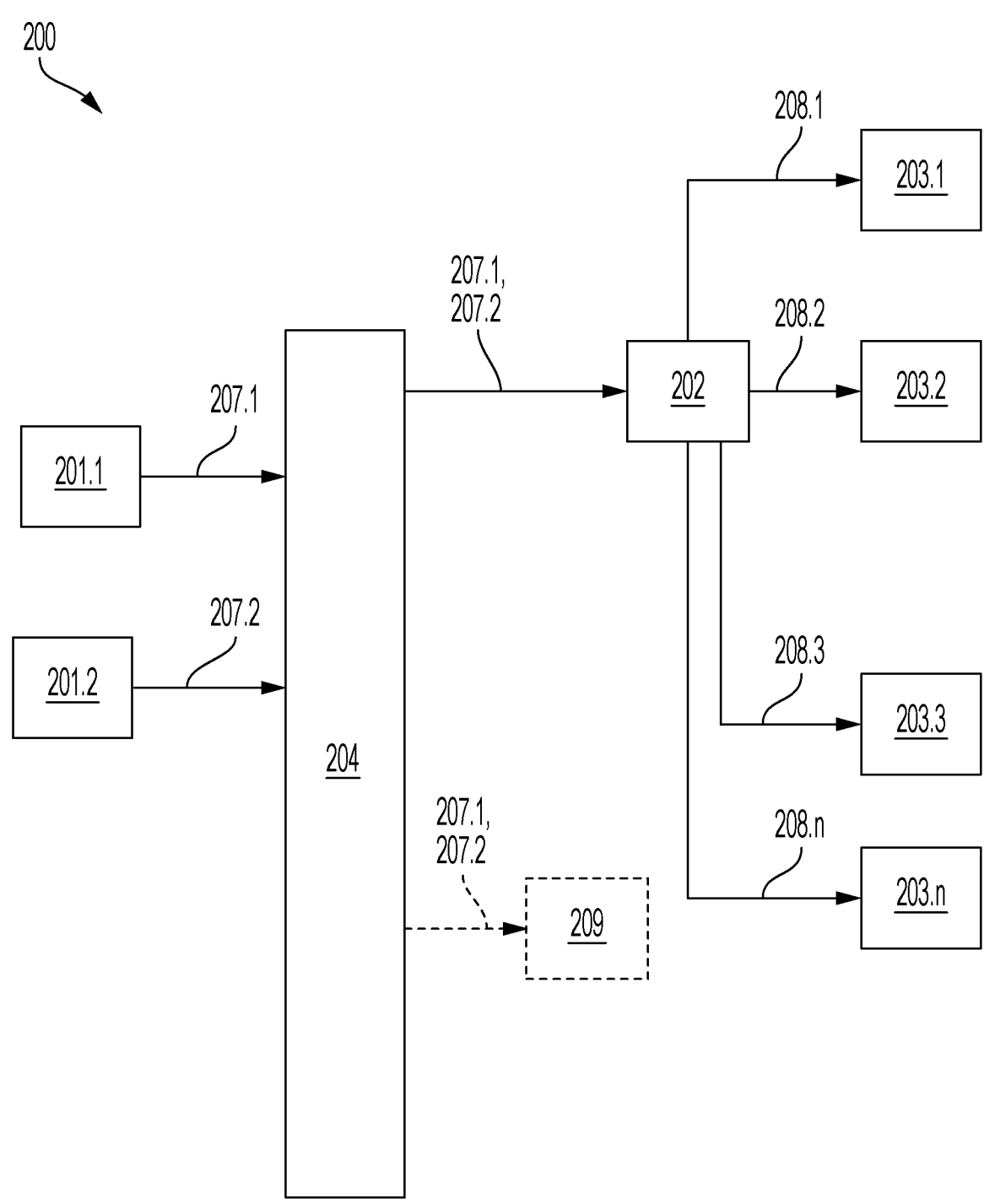
FIG. 6 shows, according to some embodiments, a photonically multiplexed optical measurement apparatus.

In an embodiment, with reference to FIG. 6, photonically multiplexed optical measurement apparatus 200 includes second laser 201.2 in optical communication with first optical switch 202.1 and that produces and communicates second laser light 207.2 to first optical switch 202.1; and optical splitter 204 optically interposed between first laser 201.1 and first optical switch 202.1 and optically interposed between second optical switch 202.2 and first optical switch 202.1, such that optical splitter 204: receives first laser light 207.1 from first laser 201.1 and second laser light 207.2 from second laser 201.2, and communicates first laser light 207.1 and second laser light 207.2 to first optical switch 202.1, wherein first optical switch 202.1: receives first and second laser lights 207 from optical splitter 204, produces first switched laser light 208.1 including first and second laser lights 207 with optical switch 202.1 in first switch state 210.1, communicates first switched laser light 208.1 to first sensor head 203.1 during first switch state 210.1, switches from first switch state 210.1 to second switch state 210.2, produces second switched laser light 208.2 including first and second laser lights 207 with optical switch 202.1 in second switch state 210.2, and communicates second switched laser light 208.2 to second sensor head 203.2 during second switch state 210.2.

Figure 8:
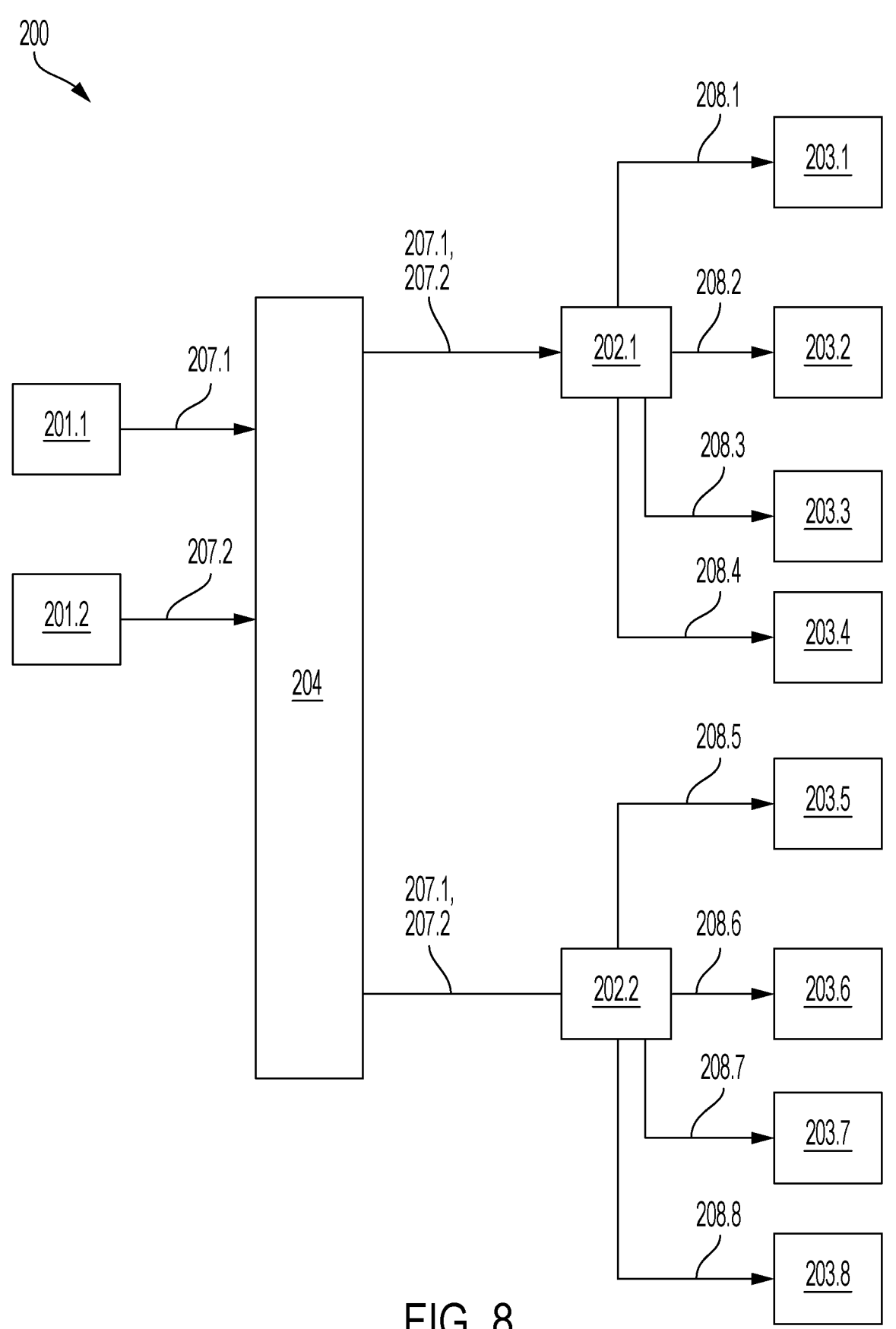
FIG. 8 shows, according to some embodiments, a photonically multiplexed optical measurement apparatus.

In an embodiment, with reference to FIG. 8, photonically multiplexed optical measurement apparatus 200 includes:

second optical switch 202.2 in optical communication with optical splitter 204, such that optical splitter 204 communicates first laser light 207.1 and second laser light 207.2 to second optical switch 202.2, and second optical switch 202.2: receives first and second laser lights 207 from optical splitter 204, produces a plurality of switched laser lights 208 including first and second laser lights 207, communicates the individual switched laser lights 208 to each sensor head 203 of a second plurality of sensor heads 203 during separate switch states 210 of second optical switch 202.2 in response to switching among the separate switch states 210; and the second plurality of sensor heads 203, each sensor head 203 being configured to measure a respective physical property of a plurality of cold atoms disposed in sensor head 203.

Figure 10:
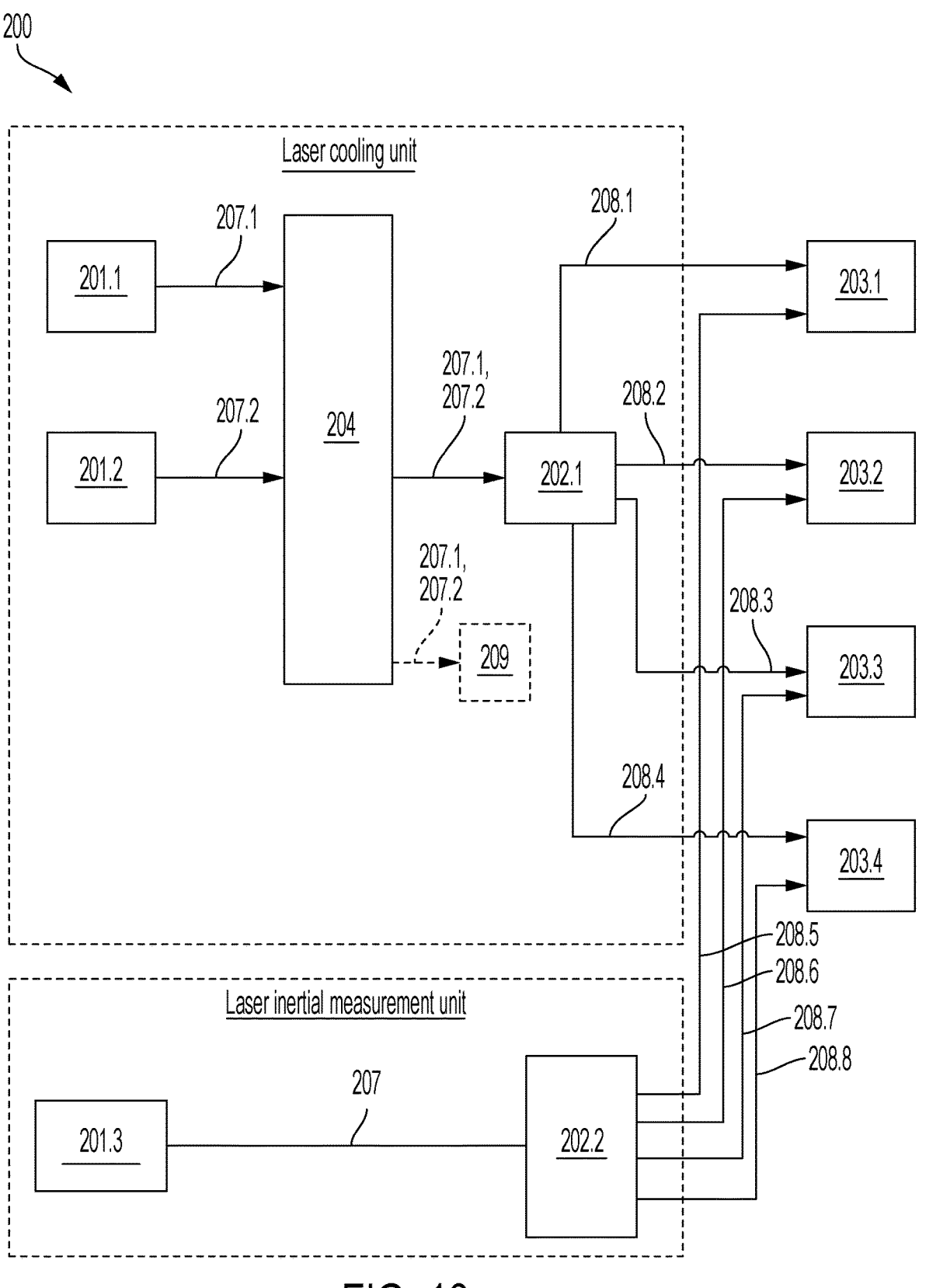
FIG. 10 shows, according to some embodiments, a photonically multiplexed optical measurement apparatus configured for use with an atom interferometer.

In an embodiment, with reference to FIG. 10, photonically multiplexed optical measurement apparatus 200 includes: second optical switch 202.2 in optical communication with third laser 201.3 and the plurality of sensor heads 203, such that second optical switch 202.2: receives third laser light 207.3 from third laser 201.3, produces a second plurality of switched laser lights 208 including third laser light 207.3, and communicates the individual switched laser lights 208 of the second plurality of switched laser lights 208 to each sensor head 203 of the plurality of sensor heads 203 during separate switch states 210 of second optical switch 202.2 in response to switching among the separate switch states 210, wherein each sensor head 203, individually and during a separate time associated with switch states 210 of second optical switch 202.2, receives a separate switched laser light 208 of the second plurality of switched laser lights 208 and measures the respective physical property of the plurality of cold atoms disposed in sensor head 203 through receiving a combination of switched laser lights 208 from first optical switch 202.1 and second optical switch 202.2.

In an embodiment, a photonically multiplexed optical measurement apparatus includes: a laser for producing laser light; an optical switch in optical communication with the laser and configured to optically switch the laser light to a selected sensor head; a plurality of sensor heads, each sensor head being configured to measure a respective physical property of a plurality of cold atoms disposed in the sensor head; and a controller configured to control the optical switch to optically switch the laser light to the plurality of sensor heads in a sequence.

In an embodiment, the plurality of sensor heads are configured to measure different physical properties. In an embodiment, the plurality of sensor heads are configured to measure the same physical property.

In an embodiment, the laser system is configured to provide laser light of different wavelengths. In an embodiment, the laser system is configured to provide laser light of the same wavelength.

In an embodiment, the optical switch is configured to optically switch the laser light from the laser system to a selected sensor head in a wavelength-division multiplexing (WDM) scheme. It should be appreciated that wavelength-division multiplexing allows multiple optical signals to be transmitted simultaneously on a single optical fiber. This is done by using different wavelengths of light for each signal. WDM is a very efficient way to use optical fiber, and it can increase the capacity of optical fiber networks by a factor of 100 or more. A WDM systems can use the multiplexer to combine the different wavelengths of light into a single signal, wherein the splitter divides the optical fiber into multiple channels, each of which carries a different wavelength of light. The combined signal is then transmitted over the optical fiber to a demultiplexer. The demultiplexer separates the different wavelengths of light back into their individual channels. Accordingly, WDM-based systems can be used in a variety of applications, including telecommunications, data networking, and industrial automation. In telecommunications, WDM is used to increase the capacity of long-distance fiber optic networks. In data networking, WDM is used to connect data centers and other high-bandwidth networks. In industrial automation, WDM is used to control machines and other devices over long distances. In an embodiment, the sensor heads are multiplexed in wavelength.

In an embodiment, the optical switch is configured to optically switch the laser light from the laser system to a selected sensor head in a time-division multiplexing (TDM) scheme. It should be appreciated that time-division multiplexing (TDM) is a method of transmitting and receiving independent signals over a common signal path by means of synchronized switches at each end of the transmission line so that each signal appears on the line only a fraction of time in an alternating pattern. This method transmits two or more digital signals or analog signals over a common channel. It can be used when the bit rate of the transmission medium exceeds that of the signal to be transmitted. TDM can be used in a variety of applications, including telecommunications, data networking, and industrial automation. In telecommunications, TDM is used to increase the capacity of long-distance telephone networks. In data networking, TDM is used to connect computers and other devices on a local area network (LAN). In industrial automation, TDM is used to control machines and other devices over long distances. TDM works by dividing the transmission time into equal slots. Each slot is assigned to a single signal. The signals are transmitted in a round-robin fashion, with each signal being transmitted for a single slot before the next signal is transmitted. This process is repeated continuously until all of the signals have been transmitted. TDM is a very efficient way to use a transmission medium. It allows multiple signals to be transmitted over a single medium without any interference between the signals. TDM is also a very reliable method of transmission. The signals are transmitted in a fixed order, so there is no chance of a signal being lost or corrupted. In an embodiment, the sensor heads are multiplexed in time.

In an embodiment, the control unit is configured to perform a correlation operation between the plurality of measurement signals and the plurality of measurement outputs. In an embodiment, the control unit is configured to perform a decoding operation on the plurality of measurement outputs to generate a plurality of measurement results. In an embodiment, the controller is configured to control the lasers such that the sensor heads are multiplexed in a time-division multiplexing scheme. In an embodiment, the controller is configured to control the lasers such that the sensor heads are multiplexed in a wavelength-division multiplexing scheme.

In an embodiment, each sensor head comprises an atom interferometer. In an embodiment, each sensor head comprises a vacuum pressure sensor. In an embodiment, each sensor head comprises an inertial sensor. In an embodiment, each sensor head comprises an optical clock. In an embodiment, each sensor head comprises a microwave atomic clock.

In an embodiment, the photonically multiplexed optical measurement apparatus is configured to measure a property of cold atoms that is a function of time. In an embodiment, the photonically multiplexed optical measurement apparatus is configured to measure a property of cold atoms that is a function of wavelength or frequency.

In an embodiment, the optical switching is performed by acousto-optic modulators. In an embodiment, the optical switching is performed by electro-optic modulators. In an embodiment, the optical switching is performed by liquid crystal modulators.

In an embodiment, with reference to FIG. 1, photonically multiplexed optical measurement apparatus 200 includes laser 201 that produces laser light 207; optical switch 202 in optical communication with laser 201 and that receives laser light 207 from laser 201, produces switched laser light 208 from laser light 207, and selectively communicates switched laser light 208 to sensor head 203; and a plurality of sensor heads 203 in optical communication with optical switch 202, such that a selected sensor head 203 receives switched laser light 208 from optical switch 202. Accordingly, photonically multiplexed optical measurement apparatus 200 includes a plurality of sensor heads 203, and a single laser 201 provides laser light 207 as switched laser light 208 to a selected sensor head 203 by virtue of optical switching by optical switch 202. Here, an arbitrary number n (an integer) of sensor heads 203 individually receive switched laser light 208 from optical switch 202, wherein optical switch 202 optically couples sensor heads 203 to laser 201. Such optical coupling can occur via fiber optics or free space propagation. Moreover, the number n (e.g., 2, 3, 4, . . . , n) of sensor heads 203 can be selected based on an application of photonically multiplexed optical measurement apparatus 200, and optical switch 202 can be a 1×n fiber optical switch, e.g., a polarization maintaining fiber optical switch. In some embodiments, laser light 207 from laser 201 is fiber coupled and passes through 1×n optical switch 202 that directs optical switch 202 as switched laser light 208 to any of sensor head 203.1, sensor head 203.2, sensor head 203.3, . . . , sensor head 203.n. By switching optical switch 202 from laser 201 between each of sensor head 203.1, sensor head 203.2, sensor head 203.3, . . . , sensor head 203.n by optical switch 202, photonically multiplexed optical measurement apparatus 200 provides measurement, e.g., of the vacuum pressure in each of sensor head 203.1, sensor head 203.2, sensor head 203.3, . . . , sensor head 203.n.

Figure 2:
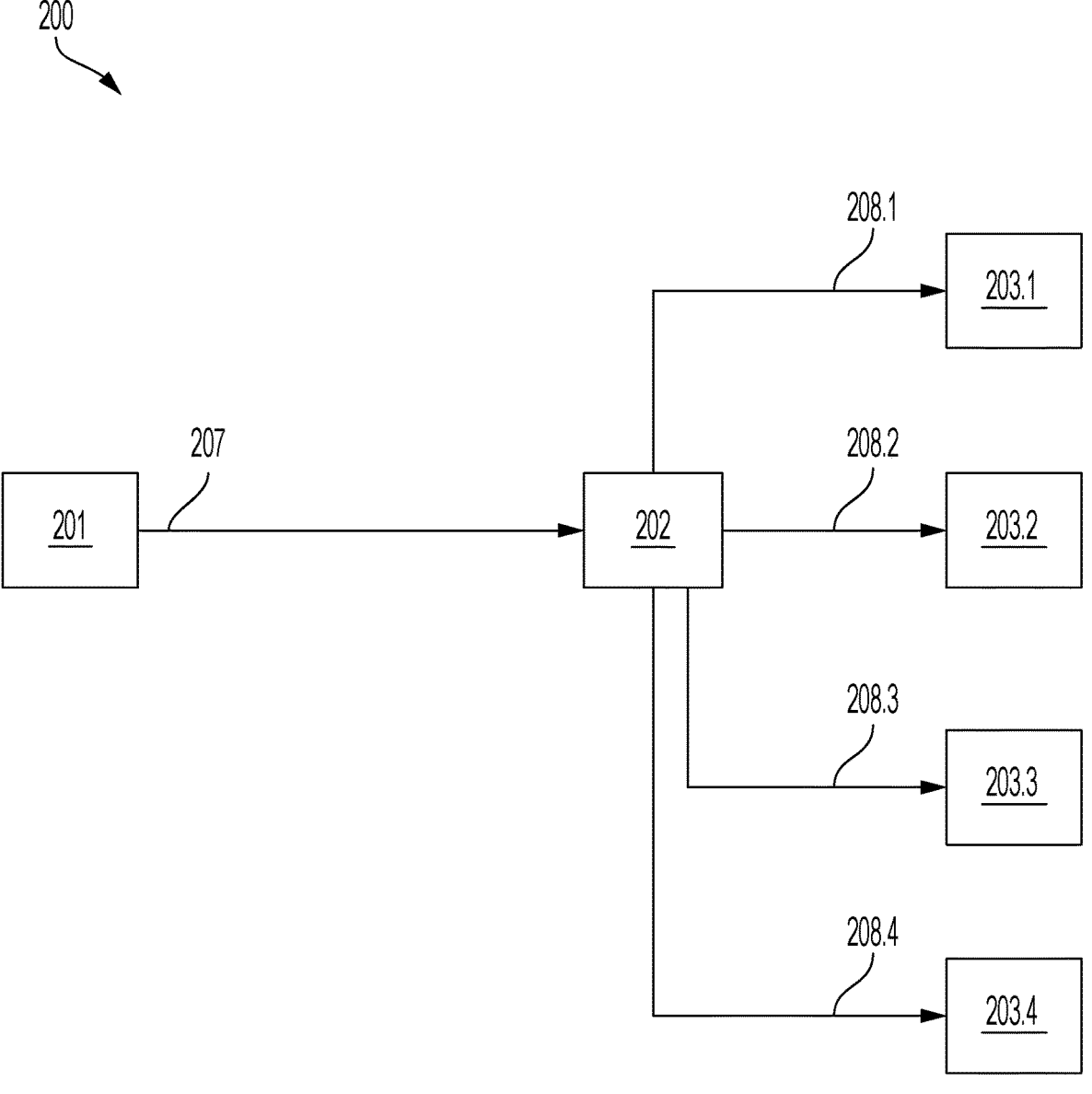
FIG. 2 shows, according to some embodiments, a photonically multiplexed optical measurement apparatus.
Figure 3:
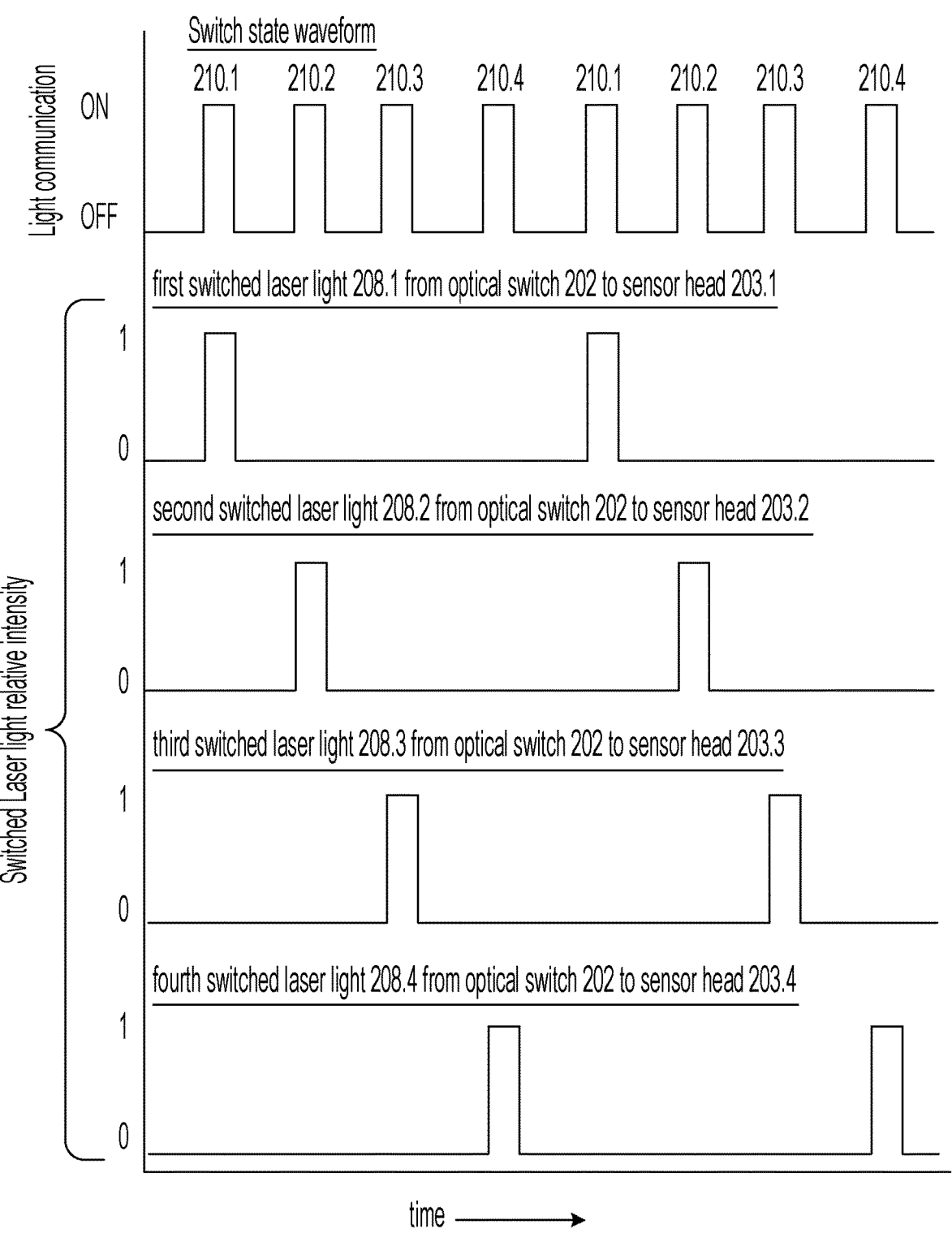
FIG. 3 shows, according to some embodiments, a waveform of a switch state of an optical switch and corresponding communication of switched laser light to various sensor heads of a photonically multiplexed optical measurement apparatus.

The number of sensor heads 203 can be arbitrary, with the number of shared lasers 201 providing switched laser light 208 from laser light 207 being less than the number of sensor heads 203. In an embodiment, with reference to FIG. 2, photonically multiplexed optical measurement apparatus 200 includes single shared laser 201 providing laser light 207 to a plurality of sensor heads 203. Although four sensor heads 203 are shown in FIG. 2, it should be appreciated that the number of sensor heads 203 can be two or more, with an upper bound on the number of sensor heads 203 provided by the particular application of photonically multiplexed optical measurement apparatus 200 and optical properties of the system being investigating such as a lower limit of optical power received by each sensor head 203.

In an embodiment a process, for performing optical multiplexing includes selectively switching optical switch 202 for subsequent multiplexing. In an embodiment, a process for performing optical multiplexing includes selectively switching optical switch 202 for interlaced multiplexing. In subsequent multiplexing, optical switch 202 switches communication of switched laser light 208 from laser 201 to operate first sensor head 203.1, wherein first sensor head 203.1 traps, holds for a variable measurement time, and counts atoms with first switched laser light 208.1. After measurement is complete at first sensor head 203.1, optical switch 202 switches and communicates optical switch 202 as second switched laser light 208.2 to second sensor head 203.2 to operate second sensor head 203.2, and the process repeats. After optical switch 202 cycles laser light 207 from laser 201 to each sensor head 203 a desired number of times, the lifetime of trapped atoms in each sensor head 203 is converted to the vacuum pressure in each sensor head 203.

Figure 4:
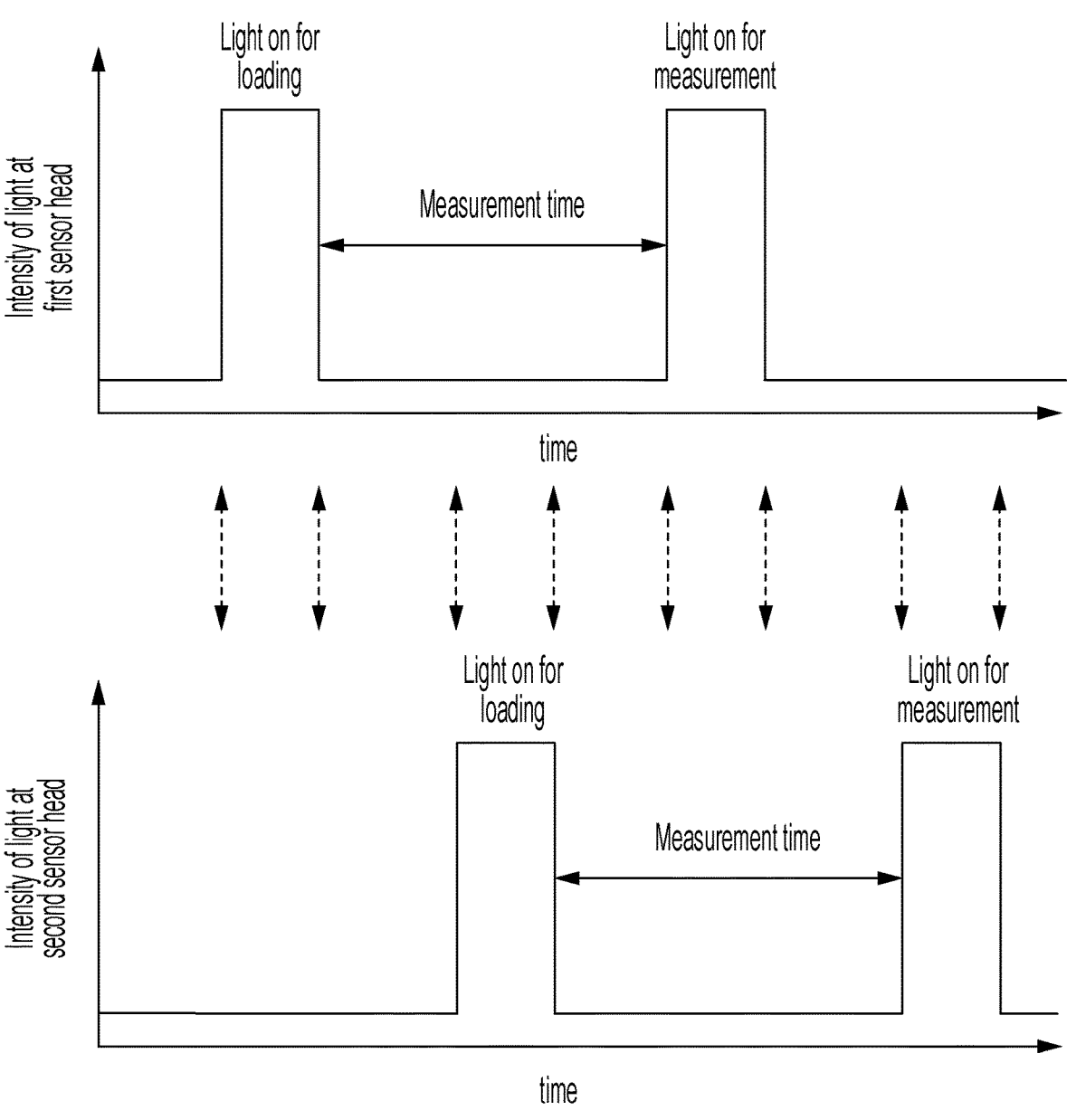
FIG. 4 shows, according to some embodiments, a waveform of a switch state of an optical switch and corresponding communication of switched laser light to various sensor heads of a photonically multiplexed optical measurement apparatus 00.

Because a particular sensor head 203 does not require switched laser light 208 from laser 201 during the measurement time, optical switch 202 from laser 201 can be used efficiently with interlaced multiplexing as shown in FIG. 4, wherein dashed arrows indicate a temporal correspondence and show that laser light is not received in multiple sensor heads 203 coincidentally, e.g., for operation of two sensor heads 203 although it should be appreciated that an arbitrary number of sensor heads 203 operate accordingly. In an embodiment of interlaced multiplexing, optical switch 202 switches laser light 207 from laser 201 as first switched laser light 208.1 to first sensor head 203.1, wherein after first sensor head 203.1 loads atoms into its magnetic trap, when laser 201 might typically be idle, optical switch 202 instead switches laser light 207 from laser 201 as second switched laser light 208.2 to second sensor head 203.2. After second sensor head 203.2 loads atoms into its magnetic trap, optical switch 202 switches laser light 207 from laser 201 as first switched laser light 208.1 back to first sensor head 203.1 to count the number of atoms remaining in first sensor head 203.1. After counting the number of remaining atoms in first sensor head 203.1, optical switch 202 switches from communicating first switched laser light 208.1 to first sensor head 203.1 again to communicating second switched laser light 208.2 to second sensor head 203.2 to count the number of atoms remaining in second sensor head 203.2. After repeating interlaced multiplexing multiple times, the lifetime of trapped atoms in each sensor head 203 is converted to the vacuum pressure in each sensor head 203. Interlaced multiplexing decreases the total time to measure the vacuum pressure in each sensor head 203 by a factor of the total number of operating sensor heads 203, e.g., a factor of four in the case of four sensor heads 203 configured per FIG. 1 and generally by a factor of n for n-sensor heads 203. Without wishing to be bound by theory, it is believed that interlaced multiplexing can be used when the measurement time in each sensor head 203 is greater than the time needed to trap atoms in each sensor head 203.

In an embodiment, two sensor heads 203 are operated from the same laser using subsequent multiplexing. Operation of the two sensor heads 203 with interlaced multiplexing, and the measurement time can exceed the atom trapping time so that the maximum pressure for interlaced multiplexing can be, e.g., approximately $10^{-6}$ Pa.

Photonically multiplexed optical measurement apparatus 200 and performing optical multiplexing can be used to multiplex several cold-atom sensor heads 203 together to share the same laser system. In an embodiment, performing optical multiplexing including interlaced multiplexing provides rejection of certain noise processes, e.g., wherein the measurement time exceeds the time needed to produce cold atoms and initiate the measurement. The atom production and initiation time can be, e.g., on the order of 1 s. As a result, interlaced multiplexing can be used with sensor heads 203 that trap the cold atoms during the measurement time. Exemplary sensor heads 203 include optical lattice clocks, optical cavity interferometers, quantum memories, and vacuum sensors (such as pCAVS).

Figure 5:
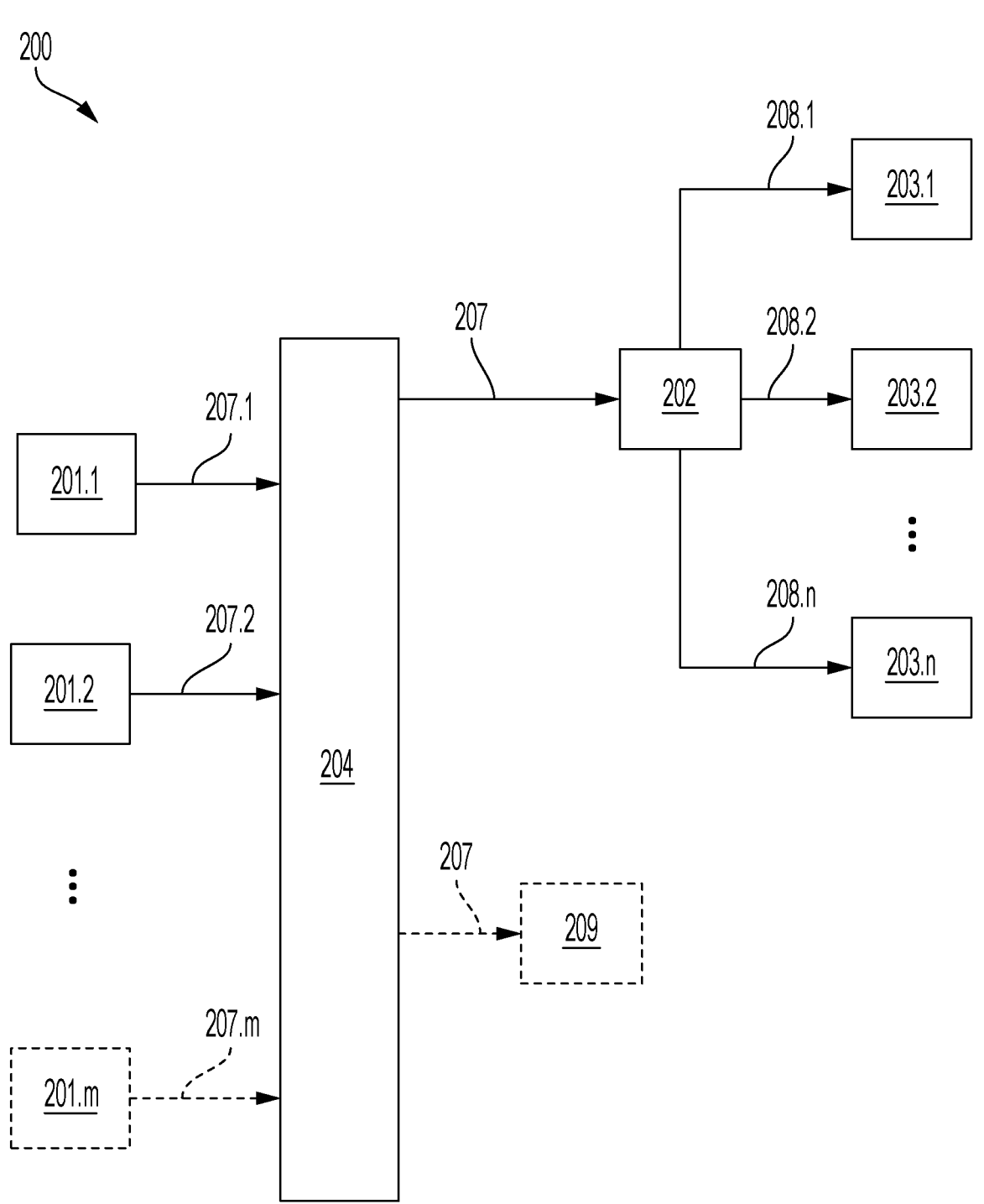
FIG. 5 shows, according to some embodiments, a photonically multiplexed optical measurement apparatus.

Photonically multiplexed optical measurement apparatus 200 can include various numbers or arrangements of lasers 201, optical switches 202, or sensor heads 203. In an embodiment, photonically multiplexed optical measurement apparatus 200 can include sensor heads 203 that include pCAVS, wherein alkali atoms (e.g., lithium atoms) are disposed in sensor heads 203 and subjected to laser from single laser 201. Other sensor heads 203 can use other laser-coolable elements that require a plurality, e.g., two or more, lasers 201 for cooling, e.g., as shown in FIG. 5. Here, optical splitter 204 (e.g., a 2×2 optical fiber splitter) receives laser lights 207 from a plurality of lasers 201, combines laser lights 207 from lasers 201 to make combined laser light 207, communicates combined laser light 207 to optical switch 202 and optionally light device 209 (e.g., a beam dump, power meter, and the like) to operate and provide switched laser light 208 to a plurality of sensor heads 203. In some embodiments, with reference to FIG. 5, a selected amount of optical power (e.g., half) of laser light 207 is terminated into beam dump 209 and lost to sensor heads 203. The number of sensor heads 203 can be arbitrary, with the number of shared lasers 201 providing switched laser light 208 from laser light 207 being less than the number of sensor heads 203. In an embodiment, with reference to FIG. 6, photonically multiplexed optical measurement apparatus 200 includes shared first laser 201.1 providing first laser light 207.1 and second laser 201.2 providing second laser light 207.2 to a plurality of sensor heads 203. Although four sensor heads 203 are shown in FIG. 6, it should be appreciated that the number of sensor heads 203 can have an upper bound provided by the particular application of photonically multiplexed optical measurement apparatus 200 and optical properties of the system being investigating such as a lower limit of optical power received by each sensor head 203.

Figure 7:
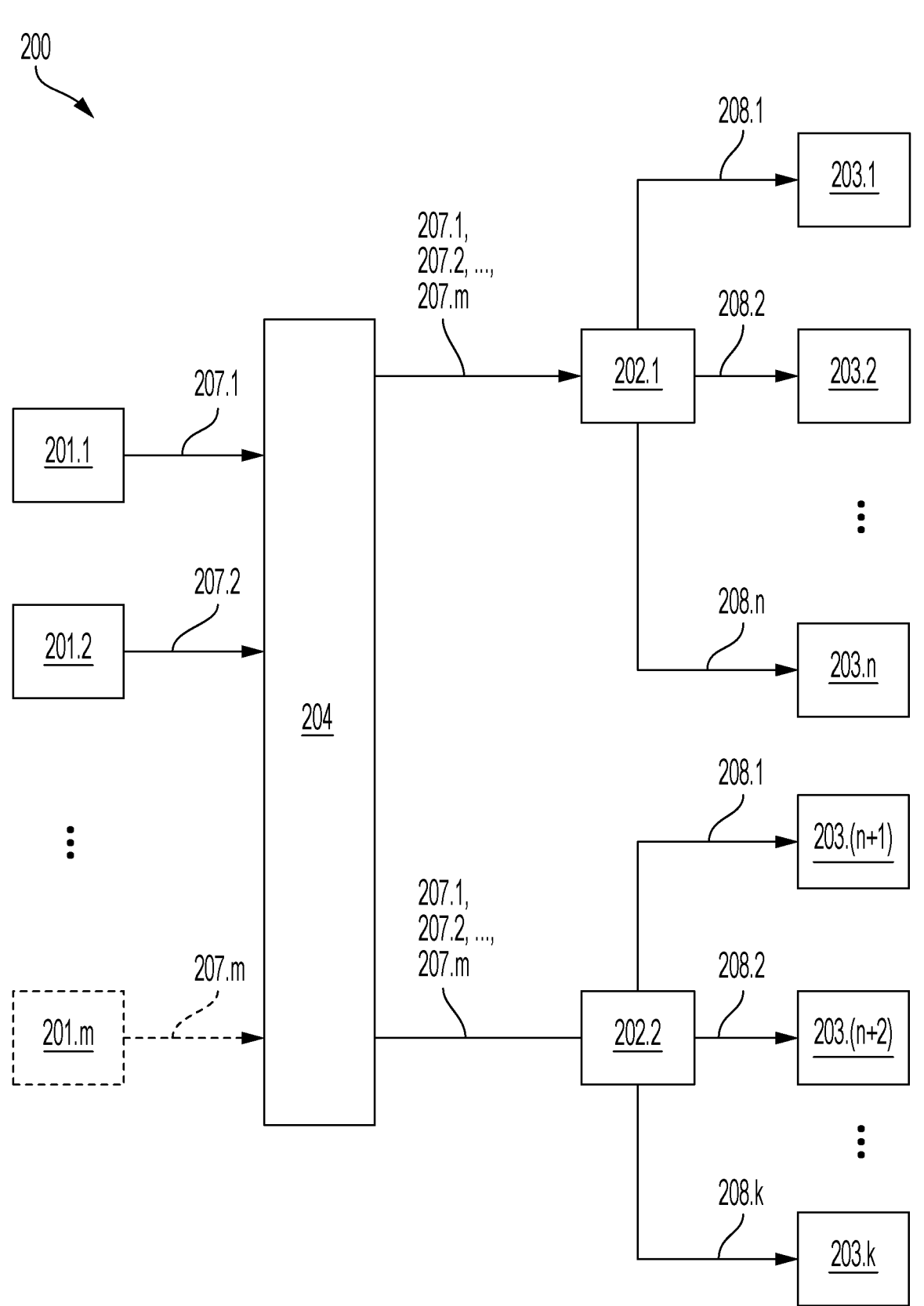
FIG. 7 shows, according to some embodiments, a photonically multiplexed optical measurement apparatus.

Alternatively, the optical power received by light device 209 can be used to operate additional sensor heads 203, e.g., as shown in FIG. 7. By sending second laser light 207.2 of optical splitter 204 (e.g., an (m×j)-optical splitter having a number m of optical inputs and a number j of optical outputs, e.g., a 2×2 fiber splitter) to second optical switch 202.2, first laser 201.1 and second laser 201.2 can be used to operate additional sensor heads 203 (e.g., sensor heads 203.($n$+1), 203.($n$+2), . . . , 203.$k$. The number of sensor heads 203 can be arbitrary, with the number of shared lasers 201 providing switched laser light 208 from laser light 207 being less than the number of sensor heads 203. In an embodiment, with reference to FIG. 8, photonically multiplexed optical measurement apparatus 200 includes shared first laser 201.1 providing first laser light 207.1 and second laser 201.2 providing second laser light 207.2 to a plurality of sensor heads 203, wherein optical splitter 204 splits laser light 207 and communicates it to first optical switch 202.1 in optical communication with sensor heads 203 (203.1, 203.2, 203.3, and 203.4) and to second optical switch 202.2 in optical communication with sensor heads 203 (203.5, 203.6, 203.7, and 203.8). Although two sets of four sensor heads 203 connected to separate optical switches 202 (202.1 or 202.2) are shown in FIG. 8, it should be appreciated that the number of sensor heads 203 or optical switches 202 can have an upper bound provided by the particular application of photonically multiplexed optical measurement apparatus 200 and optical properties of the system being investigating such as a lower limit of optical power received by each sensor head 203.

While sensor heads like pCAVS can be used that involve laser cooling and trapping atoms, other sensor heads can be used as well in photonically multiplexed optical measurement apparatus 200. In an embodiment, sensor head 203 is an atom interferometer that measures inertial forces, wherein photonically multiplexed optical measurement apparatus 200 includes three lasers 201 (two lasers for cooling and one laser for the inertial measurement), e.g., as shown in FIG. 9.

Figure 9:
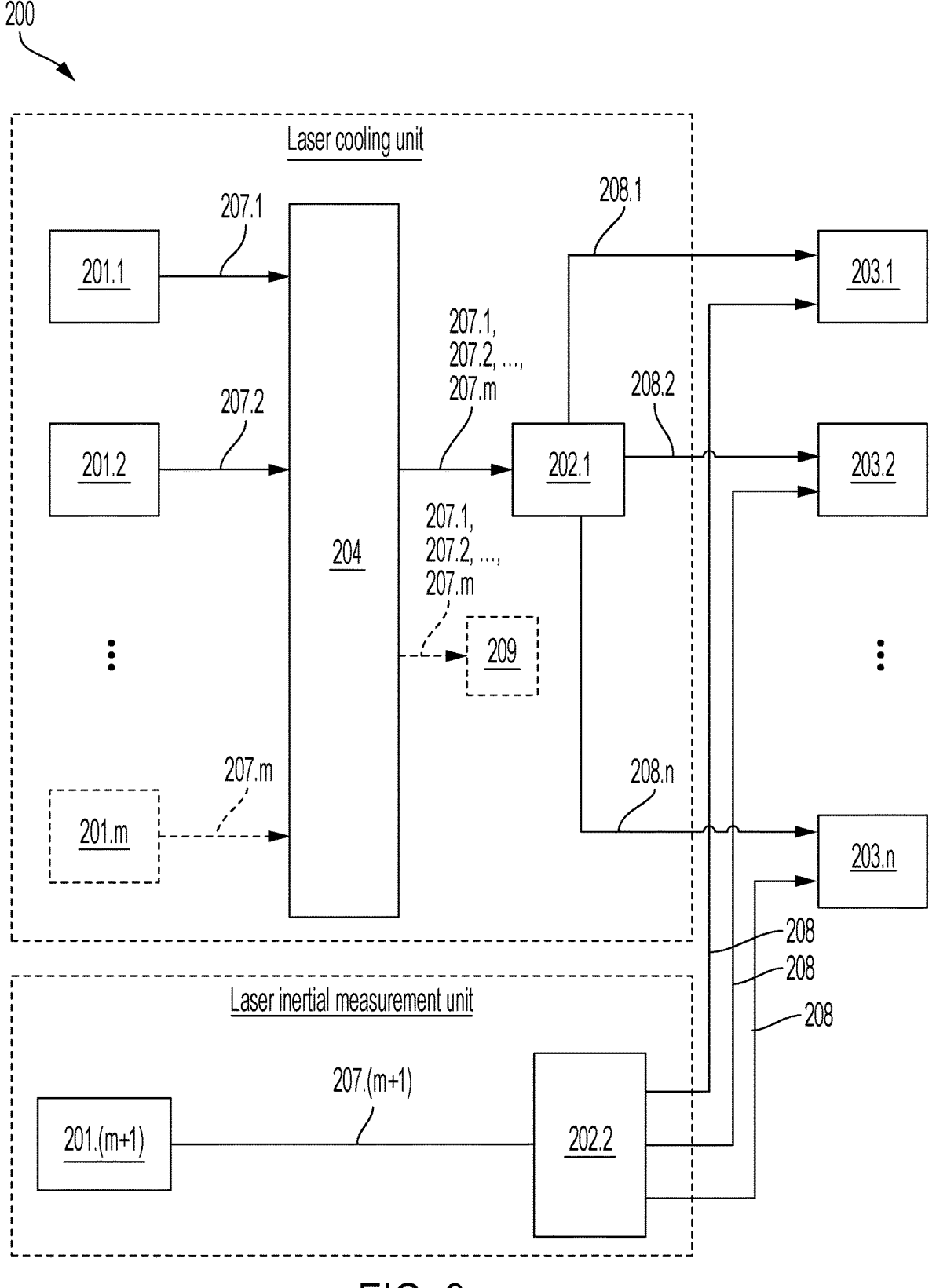
FIG. 9 shows, according to some embodiments, a photonically multiplexed optical measurement apparatus configured for use with an atom interferometer.

In an embodiment, with reference to FIG. 9, each sensor head 203 has, e.g., two optical inputs: one optical input for cooling light (provided by lasers (201.1, 201.2, . . . , 201.$m$) via optical splitter 204 and first optical switch 202.1) and another optical input for inertial measurement. The inertial measurement laser light is provided by laser 201.($m$+1) via second optical switch 202.2. In this realization, sensor heads (203.1, 203.2, 203.3) can perform independent measurements of inertial forces in three spatial directions, and sensor head 203.4 can be configured to measure rotations. It should be appreciated that all sensor heads 203 can share the same set of lasers 201, allowing a compact and low-cost realization of an inertial measurement unit. The number of sensor heads 203 can be arbitrary, with the number of shared lasers 201 providing switched laser light 208 from laser light 207 being less than the number of sensor heads 203. In an embodiment, with reference to FIG. 10, photonically multiplexed optical measurement apparatus 200 includes shared first laser 201.1 providing first laser light 207.1 and second laser 201.2 providing second laser light 207.2 to a plurality of sensor heads 203, wherein optical splitter 204 splits laser light 207 (207.1, 207.2) and communicates it to first optical switch 202.1 in optical communication with sensor heads 203 (203.1, 203.2, 203.3, and 203.4), and shared third laser 201.3 providing third laser light 207.2 to second optical switch 202.2 that communicates third laser light 207.3 as switched laser light 208 (208.5, 208.6, 208.7, 208.8) to sensor heads 203 (203.1, 203.2, 203.3, and 203.4). Although two sets of four sensor heads 203 connected to separate optical switches 202 (202.1 or 202.2) are shown in FIG. 10, it should be appreciated that the number of sensor heads 203 or optical switches 202 can have an upper bound provided by the particular application of photonically multiplexed optical measurement apparatus 200 and optical properties of the system being investigating such as a lower limit of optical power received by each sensor head 203.

Photonically multiplexed optical measurement apparatus 200 benefits conventional cold atom devices. When used with atom clock sensor heads, photonically multiplexed optical measurement apparatus 200 rejects aliasing noise via interlaced multiplexing and provides efficient deployment of clock networks. When included with atom interferometer sensor heads, photonically multiplexed optical measurement apparatus 200 provides sensor heads 203 with an inertial measurement unit. When used with quantum memory sensor heads, photonically multiplexed optical measurement apparatus 200 can reduce data loss and can increase bit rates in future quantum networks.

Photonically multiplexed optical measurement apparatus 200 can be made of various elements and components that are fabricated or assembled from off the shelf components. Elements of photonically multiplexed optical measurement apparatus 200 can be various sizes. Elements of photonically multiplexed optical measurement apparatus 200 can be made of a material that is physically or chemically resilient in an environment in which the multiplex cold atom device is disposed. Exemplary materials include a metal, ceramic, thermoplastic, glass, semiconductor, and the like. The elements of photonically multiplexed optical measurement apparatus 200 can be made of the same or different material and can be monolithic in a single physical body or can be separate members that are physically joined.

Photonically multiplexed optical measurement apparatus 200 can be made in various ways. It should be appreciated that photonically multiplexed optical measurement apparatus 200 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, photonically multiplexed optical measurement apparatus 200 can be disposed in a terrestrial environment or space environment. Elements of photonically multiplexed optical measurement apparatus 200 can be formed from appropriate materials to obtain selected optical, electrical, physical, and chemical properties and operating parameters.

Photonically multiplexed optical measurement apparatus 200 has numerous advantageous and unexpected benefits and uses. In an embodiment, a process of operating a photonically multiplexed optical measurement apparatus, includes: providing a photonically multiplexed optical measurement apparatus including: a laser for producing laser light; an optical switch in optical communication with the laser and configured to optically switch the laser light to a selected sensor head; a plurality of sensor heads, each sensor head being configured to measure a respective physical property of a plurality of cold atoms disposed in the sensor head; and a controller configured to control the optical switch to optically switch the laser light to the plurality of sensor heads in a sequence; selecting a sensor head from the plurality of sensor heads; providing, by the optical switch, switched laser light 208 to the selected sensor head; measuring the property of cold atoms using the selected sensor head; and turning off, by optical switch 202, switched laser light 208 to the selected sensor head.

In an embodiment, the property of cold atoms is vacuum pressure. In an embodiment, the property of cold atoms is inertial forces. In an embodiment, the property of cold atoms is gravitational acceleration. In an embodiment, the property of cold atoms is time. In an embodiment, the property of cold atoms is frequency. In an embodiment, selecting a sensor head is performed in a time-division multiplexing scheme. In an embodiment, selecting a sensor head is performed in a wavelength-division multiplexing scheme. In an embodiment, measuring the property of cold atoms is performed by detecting the light that is scattered from the cold atoms. In an embodiment, measuring the property of cold atoms is performed by detecting the absorption of light by the cold atoms. In an embodiment, measuring the property of cold atoms is performed by detecting the fluorescence of the cold atoms. In an embodiment, measuring the property of cold atoms is performed by detecting the ionization of the cold atoms.

The following are incorporated by reference herein in their entirety: U.S. Pat. No. 8,803,072, United States Patent Application Publication No. 2020/0120785.

In an embodiment, photonically multiplexed optical measurement apparatus 200 and performing optical multiplexing can include the properties, functionality, hardware, and process steps described herein and embodied in any of the following non-exhaustive list:

a process (e.g., a computer-implemented method including various steps; or a method carried out by a computer including various steps);

an apparatus, device, or system (e.g., a data processing apparatus, device, or system including means for carrying out such various steps of the process; a data processing apparatus, device, or system including means for carrying out various steps; a data processing apparatus, device, or system including a processor adapted to or configured to perform such various steps of the process);

a computer program product (e.g., a computer program product including instructions which, when the program is executed by a computer, cause the computer to carry out such various steps of the process; a computer program product including instructions which, when the program is executed by a computer, cause the computer to carry out various steps); computer-readable storage medium or data carrier (e.g., a computer-readable storage medium including instructions which, when executed by a computer, cause the computer to carry out such various steps of the process; a computer-readable storage medium including instructions which, when executed by a computer, cause the computer to carry out various steps; a computer-readable data carrier having stored thereon the computer program product; a data carrier signal carrying the computer program product);

a computer program product including comprising instructions which, when the program is executed by a first computer, cause the first computer to encode data by performing certain steps and to transmit the encoded data to a second computer; or a computer program product including instructions which, when the program is executed by a second computer, cause the second computer to receive encoded data from a first computer and decode the received data by performing certain steps.

The articles and processes herein are illustrated further by the following Example, which is non-limiting.

Example

Comparison of two multiplexed portable cold-atom vacuum standards.

We compare the vacuum measured by two portable cold-atom vacuum standards (pCAVS) based on ultracold lithium atoms. The pCAVS are quantum-based standards that use a priori scattering calculations to convert a measured loss rate of cold atoms from a conservative trap into a background gas pressure. Our pCAVS devices share the same laser system and measure the vacuum concurrently. The two pCAVS together detected a leak with a rate on the order of $10^{-6}$ Pa L/s. After fixing the leak, the pCAVS measured a pressure of about 40 nPa with 2.6% uncertainty. The two pCAVS agree within their uncertainties, even when swapping some of their component parts. Operation of the pCAVS was found to cause some additional outgassing, on the order of $10^{-8}$ Pa L/s, which can be mitigated in the future by better thermal management.

Cold-atom vacuum standards promise to deliver accurate measurements of vacuum in the ultra-high vacuum (UHV, $<10^{-6}$ Pa) and extreme-high vacuum (XHV, $<10^{-9}$ Pa) regimes. In these regimes, hot-cathode ionization gauges, such as Bayard-Alpert gauges and their derivatives, are the typical means of pressure measurement. Yet they suffer from several known systematics, including unwanted X-ray-induced currents, electron stimulated desorption of ions and neutrals, and thermal outgassing. Cold-atom-based vacuum gauges, on the other hand, should alleviate most of these systematics, while also being a primary standard. Thus far, all cold-atom vacuum standards have been laboratory-scale devices and are not suitable replacements for an ionization gauges.

Here, we directly compare two portable cold-atom vacuum standards (pCAVS) based on ultracold lithium, the main components of which have been used to demonstrate a compact apparatus for laser cooling and trapping of strontium. The gauge head (not including the laser system) fits within a roughly 15 cm×35 cm×50 cm cuboid; the vacuum components of our standard comprise a total volume of approximately 1.3 L. The cost of the cold-atom vacuum standard is primarily driven by the laser system used to cool, trap, and count the atoms. The laser system is shared between both pCAVSs through an optical fiber switch. Using the hardware tested here, up to four pCAVS devices can be multiplexed off a single 450 mW laser. We estimate the uncertainty of our portable gauges. The reproducibility of the pCAVS is estimated, in part, by swapping components between the two. Finally, we demonstrate that by comparing two pCAVS, we can detect small vacuum leaks with rates of the order of $10^{-6}$ Pa L/s. Given the sensitivity of the pCAVS, we estimate that we can detect leaks with rates as small as $10^{-9}$ Pa L/s.

Cold-atom vacuum gauges, in their simplest form, measure the loss rate F of ultracold ($\leq500$ pK) sensor atoms from a trap induced by collisions with background gas atoms or molecules (typically near 300 K). If all other sources of sensor atom loss are small (including Majorana losses, three-body recombination losses, collisional spin-flip losses, etc.) and the cold-atom trap depth is negligible, then $\Gamma=Kn$, where K is the total elastic and inelastic rate coefficient and n is the number density of background gas atoms in the vacuum chamber. Inserting the ideal gas law, valid in the UHV and XHV, the pressure is then related to the measured decay rate through $$p = nkT = \frac{\Gamma}{K}kT,$$

where k is the Boltzmann constant and T is the temperature of the background gas.

The rate coefficient K is species dependent and typically of the order of $10^{-9}$ cm³/s. It can be estimated for different gases using semiclassical collision theory first developed in the 1960s. Accurate values from a priori quantum collision calculations are sparser. For 300 K $H_2$, the dominant background gas in the UHV and XHV domains, colliding with ultracold $^7$Li sensor atoms, this rate coefficient has been calculated a priori and is $K_{H_2}=93.18(6)\times10^{-9}$ cm³/s. At 300 K only four rotational levels of the ground vibrational level of $H_2$ are significantly populated. Similar calculations have also been completed for 300 K He colliding with ultracold $^7$Li showing $K_{He}=1.659(15)\times10^{-9}$ cm³/s. Because of this underpinning theory, cold-atom vacuum gauges are primary standards, being traceable to the SI second and kelvin.

Figure 11:
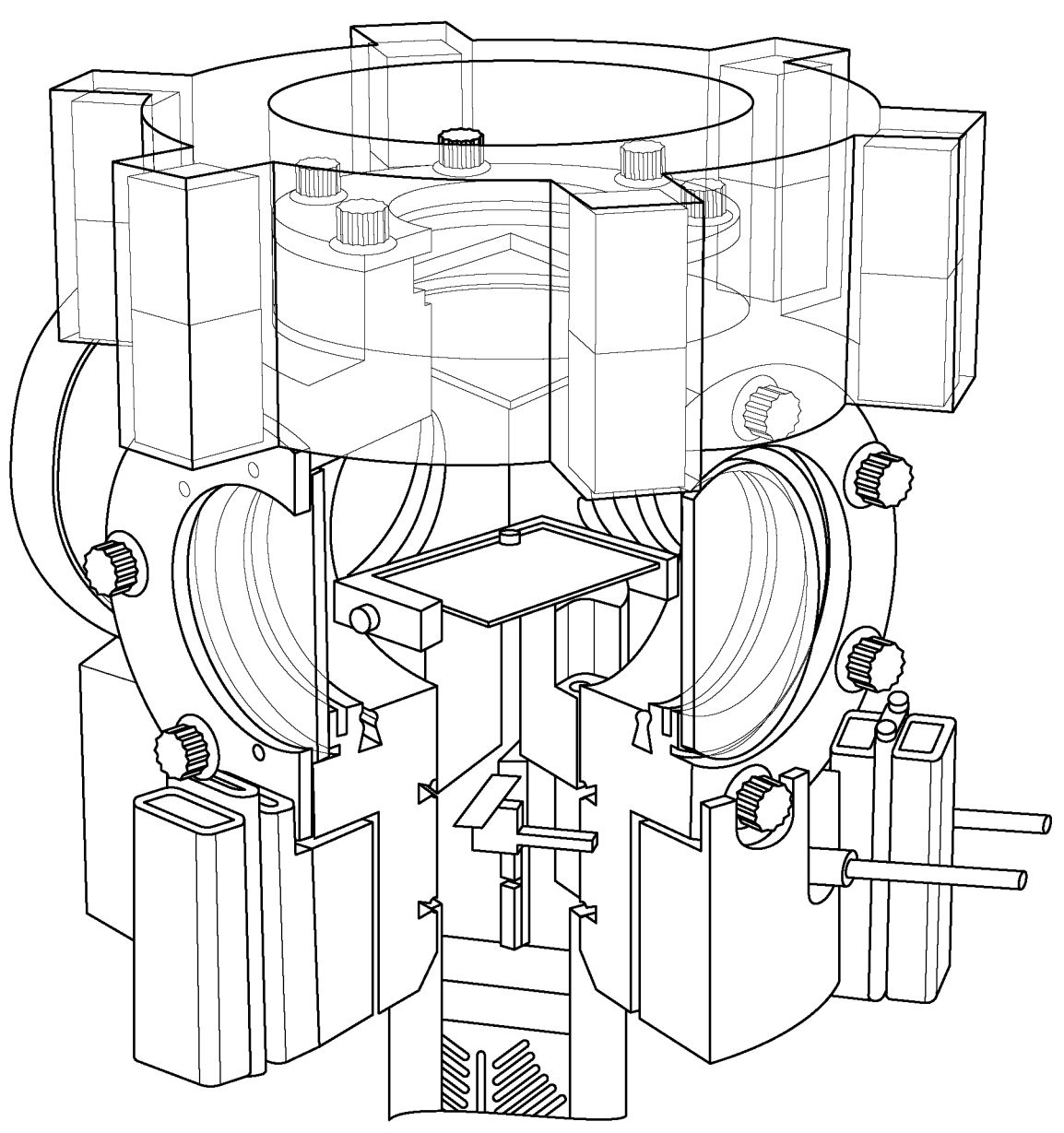
FIG. 11 shows, according to some embodiments, a portable cold-atom vacuum standard (pCAVS). The chamber for which the vacuum pressure is measured is connected at a flange on the far side of the pCAVS image along the +y-direction. A camera for imaging the sensor atoms in the MOT is mounted in the xy plane near a viewport. The z direction is along earth's gravitational acceleration. A non-evaporable getter (NEG) can pump the source chamber. The shading of the magnets indicates relative orientation of their poles.

With reference to FIG. 11, a computer-assisted-design rendering of one of our portable cold-atom vacuum standards (pCAVS) was considered. For scale, the height of one of the magnets is 3.81 cm. The chamber for which the vacuum pressure is to be measured is connected at the flange on the far side of the pCAVS image along the +y direction. The camera for imaging the sensor atoms in the MOT is mounted in the xy plane near one of the two viewports visible in the rendering. The z direction is along earth's gravitational acceleration. Not shown is the titanium shutter, which fits snugly between the dispenser and the differential pumping tube. A non-evaporable getter (NEG) pumps the source chamber. The red and blue coloring of the magnets indicate the relative orientation of their poles. Note the coordinate system in the lower right corner of the image.

The pCAVS is designed to reduce the size of the vacuum components, simplify optical alignment, and minimize outgassing into the vacuum being measured by the source of atoms. FIG. 11 shows a computer-assisted-design rendering of a pCAVS. It is divided into two sections: the source chamber that produces a beam of thermal atoms and a measurement chamber where a magneto-optical trap (MOT) is formed and the vacuum pressure is measured. The two sections are separated by a differential pumping tube of length 2.67 cm and radius 1.5 mm, yielding a conductance of approximately 0.014 L/s for $N_2$ at 300 K. The conductance for other gases is similar, as it scales as $\sqrt{m}$, where m is the mass of the background gas atom or molecule.

The source chamber contains a metal vapor source as stainless steel alkali-metal dispenser (AMD) that heats and vaporizes lithium atoms, causing them to effuse from the source toward the differential pumping tube. The AMD is heated by running a direct current i that dissipates between 2 W and 6 W in the AMD. For most data in this article, the two AMDs in the two pCAVS are connected in series, and thus have the same i. A 3D-printed titanium shutter, actuated by a small, magnetic rotary feedthrough driven by a stepper motor, can stop effusing atoms by completely blocking the differential pumping tube. In the closed position, the shutter does not form a vacuum-tight seal, but is only 0.25 mm from the end of the differential pumping tube. Such a small distance further reduces the effective conductance of the differential pumping tube. Because the warm AMD will emit species in addition to lithium through thermal outgassing into the vacuum, a non-evaporable getter (NEG) pump with 100 L/s pumping speed for $H_2$, the dominant background gas, is installed just below the AMD. Pumping speeds for other chemically reactive gas species are smaller; non-reactive noble gases must be pumped through the differential pumping tube.

The measurement section is built around a nanofabricated grating MOT chip, designed and fabricated at NIST. The input beam for the grating is produced using bulk optics. Each pCAVS uses one of two different input-beam shaping systems that produce a collimated, circularly-polarized beam with approximately 20 mm $1/e^2$ diameter. The first has a total length of 24 cm and collimates light that expands from a polarization maintaining fiber with a 150 mm lens. The second has a slightly shorter total length of 20 cm and uses a –9 mm focal length lens to force the beam to diverge more quickly from the fiber, then uses a secondary lens with focal length 100 mm to collimate the beam. Future designs can shorten the input-beam-shaping systems by either incorporating more lenses or switching to planar optics. The laser beam from each input-beam-shaping system is aligned such it is normally-incident to and centered on the grating chip. We note that though the laser beam is well-aligned to the chip, the chip normal and the differential pumping tube axis may be out of parallel by several degrees. Any misalignment reduces the efficacy of laser slowing as lithium atoms pass through the differential pumping tube, consequently causing a reduction of the MOT loading rate.

Type-N52 NdFeB permanent magnets mounted to the exterior of the chamber with 3D-printed holders generate a spherical quadrupole magnetic field used by both the MOT and subsequent magnetic trap. The zero field position is $z_T$=6.2(1.0) mm above the diffraction grating chip, where the standard uncertainty in parenthesis comes from an estimated 2 mm positioning uncertainty in the vertical direction. We did not directly measure the location of the zero of the magnetic field, which does not coincide with the center of the MOT. FIG. 11 shows a configuration of magnets and their respective holders that generates an axial gradient of B'=4.59(17) mT/cm, normal to the chip. A second configuration, includes more magnets and using different holders generates a larger axial gradient of B'=7.53(28) mT/cm. These fields are 18 and 30 times that of the minimum field gradient required to compensate gravity, respectively.

The laser light is about –9 MHz detuned from the $^2S_{1/2}$ (F=2)→$^2P_{3/2}$(F'=3) main cycling transition in $^7Li$, which has a natural linewidth $2\pi\times5.87$ MHz. Due to the unresolved hyperfine structure of the excited $2P_{3/2}$ state, atoms can fall out of the cycling transition and into the $^2S_{1/2}$(F=1) state. To pump atoms out of this F=1 state, an electro-optic modulator (EOM) is inserted into the laser beam and produces sidebands at ±813 MHz. The blue sideband is resonant to the $^2S_{1/2}$(F=1)→$^2P_{3/2}$(F'=2) transition and has roughly 50% of the power of the carrier, as measured with a Fabry-Perot cavity. An optical shutter placed after the EOM extinguishes or lets pass the laser light when appropriate. The laser light is then inserted into a 1×4 fiber switch that is used to select to which pCAVS the light is sent. The switch operates with 6 dB of loss and requires approximately 100 ms to actuate between the output ports of the switch. The switch outputs are sent to the two beam-shaping systems, where we measure approximately 20 mW of total power and a peak intensity of 12 mW/cm², approximately four times the saturation intensity of the main cycling transition.

Complementary metal-oxide semiconductor (CMOS) cameras record images of the MOT fluorescence to count the number of atoms. The cameras have 35 mm f/2 and 17 mm f/0.95 C-mount lenses that image the MOT in pCAVS #1 and pCAVS #2, respectively. The distances between the MOTs and the lenses are 24 cm and 16 cm, respectively, corresponding to numerical apertures of 0.04 and 0.06. The imaged dimensions of the MOT are roughly 2 mm by 1 mm, significantly smaller than the total field of view of 10 cm by 6 cm of the cameras. For the atom numbers used in the pCAVSs, the size, shape, and position of the MOTs are independent of atom number. Vignetting and other optical clipping effects are thus negligible.

The two pCAVSs are mounted to the same vacuum chamber, which is pumped by an ionization pump with an $N_2$ pumping speed of 60 L/s. We estimate the conductance between the pCAVSs and the ion pump to be roughly 10 L/s for $N_2$. The atom clouds in the two pCAVSs are separated by 20 cm and have direct line of site to each other. The nominal vacuum pressures at the two atom clouds should be identical.

To obtain the lowest pressures possible, we applied two treatments to the vacuum components. Prior to assembly, all stainless steel components were baked in a vacuum furnace at 400° C. for roughly 40 d to eliminate as much dissolved hydrogen as possible. After assembly, the evacuated system was baked at 150° C. for a few days to desorb water from surfaces and then allowed to cool down to ambient temperature T.

We measure the background gas temperature T using two calibrated industrial-quality platinum-resistance thermometers (PRTs). We assume the background gas is in thermal equilibrium with the chamber walls. One PRT is mounted directly onto the exterior pCAVS #1 roughly centered vertically in the measurement section; the other is mounted to the exterior of the vacuum chamber between the two pCAVS. Self-heating effects are negligible at our level of uncertainty of 1 K to 2 K.

Measurements

The following procedure measures the pressure in either pCAVS. First, the titanium shutter is opened, the EOM turned on, and the optical shutter opened to inject light into the pCAVS, forming the MOT. The MOT is loaded for about 2 s. At the end of the 2 s, the MOT fluorescence is imaged for 10 ms to determine $N_0$, the maximum number of atoms in the MOT. For both pCAVS, $N_0$ is a modest $10^5$ atoms. After the MOT is loaded, the titanium shutter is closed. The EOM is then turned off, removing light resonant with the F=1→F'=2 transition, and all $^7$Li atoms transfer into the $^2S_{1/2}$(F=1) hyperfine state. The optical shutter is then closed, and only atoms with projection quantum number $m_F=-1$ with respect to the local magnetic field direction will congregate where the magnetic field strength is zero. The closing of the optical shutter defines t=0, at which time of the order of $10^4$ atoms are trapped in the magnetic quadrupole trap. The atoms are held in the quadrupole trap for a variable interval up to time t, after which the laser and EOM are turned on for 15 ms, reforming the MOT and capturing the remaining atoms from the quadrupole trap. The MOT is then imaged for 20 ms to count the number of atoms, N. After this procedure of measuring N at a single t is completed on the first pCAVS, the laser is switched to operate the second pCAVS and measure its $N_0$ and N for the same time interval t. (This sequential operation avoids adverse light scattering from one pCAVS into another.) To measure a full decay curve, the full procedure with both pCAVS is repeated several times at different t. Thus, the pressure in each pCAVS is measured in an interlaced pattern.

Figure 12A:
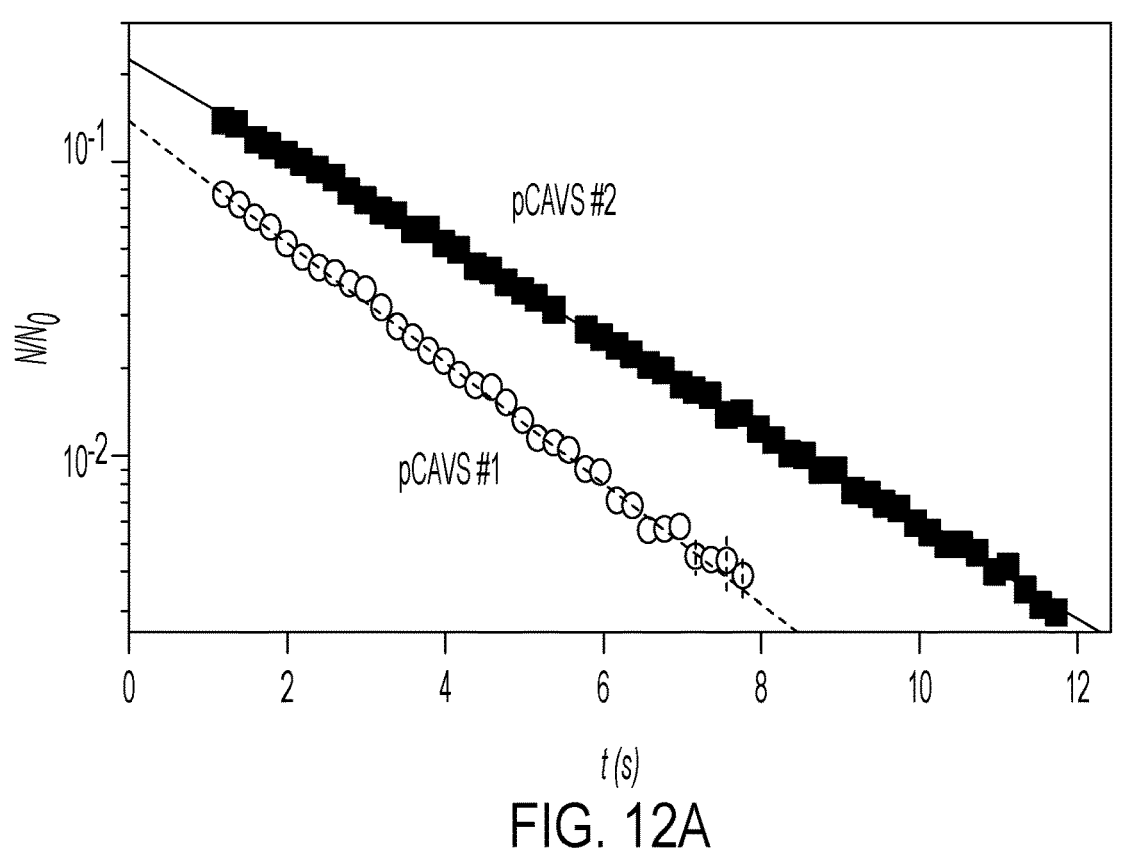
FIG. 12 shows, according to some embodiments, recaptured $^7$Li atom number N, normalized to the separately measured just after the MOT loading phase $N_0$, as functions of time t. Circles are for pCAVS #1; squares represent pCAVS #2. Solid lines show fits assuming exponential decay. These example decays were recorded before (a) and after (b) a leak in pCAVS #1 was fixed; note the difference in time scales. The error bars on the markers correspond to the standard error in the mean.

Our initial measurements with the two pCAVSs are shown in FIG. 12($a$). The graph shows the number of recaptured atoms N normalized to $N_0$ as a function of t. Shot-to-shot fluctuations in $N/N_0$ are up to 20% smaller than those in N. These data represent the mean of four repeated measurements and were taken at an AMD current of i=5.9 A. The error bars in the figure are standard uncertainties in the mean of the repeated measurements (type A, statistical uncertainty). As can be seen from FIG. 12($a$), the two pCAVS have different atom-number decay times and thus, measure different pressures. Each of the curves is fit to $N/N_0=Ae^{-\Gamma t}$, where A and Γ are adjusted parameters. The decays fit well to exponentials with no transients, indicating the absence of cold atom-cold atom collisional losses in the magnetic trap for t>1 s. Least-square fits assuming uncorrelated uncertainties at different t yield Γ=0.471(4) s$^{-1}$ with reduced XV equal to 1.0 and Γ=0.362(2) s$^{-1}$ with reduced $$\chi_v^2$$

equal to 10 for pCAVS #1 and pCAVS #2, respectively. The number of degrees of freedom ν are 32 and 51, respectively. The large reduced $$\chi_v^2$$

for pCAVS #2 is caused by an underestimate of the uncertainty of $N/N_0$ at five times t, presumably due to using only four repeats to determine the standard error in the mean. We account for this implied systematic uncertainty by multiplying the covariance matrix for parameters A and Γ by reduced $$\chi_v^2,$$

i.e., increasing the uncertainty of Γ for pCAVS #2 to the quoted 0.002 s$^{-1}$.

We examine potential causes for the different decay rates including: the AMDs, the input beam-shaping systems, and the magnets and their respective holders. The AMDs could dissipate different amounts of heat, causing them to have different temperatures and outgassing rates. Different outgassing rates could give rise to a pressure gradient between the two pCAVS devices. We tested this by measuring the decay rate as a function of current i, but did not observe a statistically significant change between 6 A to 8 A. We then swapped the input beam-shaping systems. At constant current, the decay rates measured by the two pCAVSs were statistically unchanged with the ratio of measured Γs before and after exchanging input beam-shaping systems equal to 0.90(5) and 0.93(8) for pCAVS #1 and pCAVS #2, respectively. Finally, we increased the magnetic field gradient from 4.6 mT/cm to 7.5 mT/cm, and the ratio of the measured Γs was 1.04(5) and 1.00(8), for pCAVS #1 and pCAVS #2, respectively.

One can also consider that the two pCAVS were simply at different pressures. A leak could cause such a discrepancy, and we can estimate the leak rate using our two pCAVS devices. Because the leak gas is mostly $N_2$ (air) and using the semi-classical estimate of $K_{N_2}=2.5\times10^{-9}$ cm$^3$/s at a temperature T=295 K, the $N_2$ pressure is $7\times10^{-7}$ Pa and $6\times10^{-7}$ Pa in pCAVS #1 and #2, respectively, giving a pressure difference of $1\times10^{-7}$ Pa. With the 10 L/s estimated pumping speed on each pCAVS, the leak rate is then of the order of $10^{-6}$ Pa L/s (equivalent to a flow of the order of $10^{-13}$ mol/s), small enough to evade detection with a residual gas analyzer using a Faraday cup detector. Attaching a Hiden HAL RC 201 residual gas analyzer with an electron multiplier to the vacuum system, we found the leak in the glass-to-metal seal of one of the viewports on pCAVS #1 via helium leak testing and verified the estimate of the leak rate.

After repairing the leak, the two pCAVS measure equal decay times, as shown in FIG. 12 ($b$), for i=7.5 A and T=301.7(1.6) K. Once again, each data point is an average of $N/N_0$ of four repeats; the error bar is the k=1 standard uncertainty in the mean. Once again, the decays fit well to exponentials with no transients for t>2 s. Least-square fits to an exponential as function of t assuming uncorrelated uncertainties yield Γ=0.0316(6) s$^{-1}$ with reduced $$\chi_v^2$$

equal to 3.8 and Γ=0.0321(3) s$^{-1}$ with reduced $$\chi_v^2$$

equal to 0.7 for pCAVS #1 and pCAVS #2, respectively. The number of degrees of freedom ν are 29 and 28, respectively. Here, the large reduced $$\chi_\nu^2$$

$$E_6 = \hbar^2/2\mu x_6^2, \mu = m_{Li}m_{H_2}/\left(m_{Li}+m_{H_2}\right)$$

for pCAVS #1 comes from the large scatter of points at times $t>60$ s, where N becomes close to our atom-number detection threshold. As before, we account for this implied systematic uncertainty by increasing the covariance matrix for parameters A and $\Gamma$ by reduced $$\chi_\nu^2,$$

i.e., increasing the uncertainty of F for pCAVS #1 to the quoted 0.0006 $s^{-1}$. The two pCAVS agree at the $k=1$ uncertainty level.

Let us now calculate the pressure in the vacuum chamber and its uncertainty including potential systematic shifts inherent in the operation of the pCAVSs. We can safely assume that the background gas is $H_2$, as it is typically the dominant contaminant of a vacuum chamber in the UHV and XHV regimes when no leaks are present. We modify Eq. 1 to include "glancing" collisions, i.e., collisions that do not transfer enough energy to eject an atom from the trap, and other loss mechanisms inherent to the quadrupole trap and resulting from collisions between cold $^7Li$ atoms. With these modifications, the pressure p is found through $$p = \frac{\Gamma - \Gamma_{other}}{K_{H_2} \times [1 - f_{gl}(U)]} kT, \tag{1}$$

where $\Gamma_{other}$ captures other loss mechanisms and $f_{gl}(U)$ is the fraction of glancing collisions given a quadrupole trap depth U. At our level of uncertainty, we can safely neglect both the background gas temperature and $^7Li$ temperature dependence of the rate coefficient $K_{H_2}$ given in the introduction.

Figure 12B:
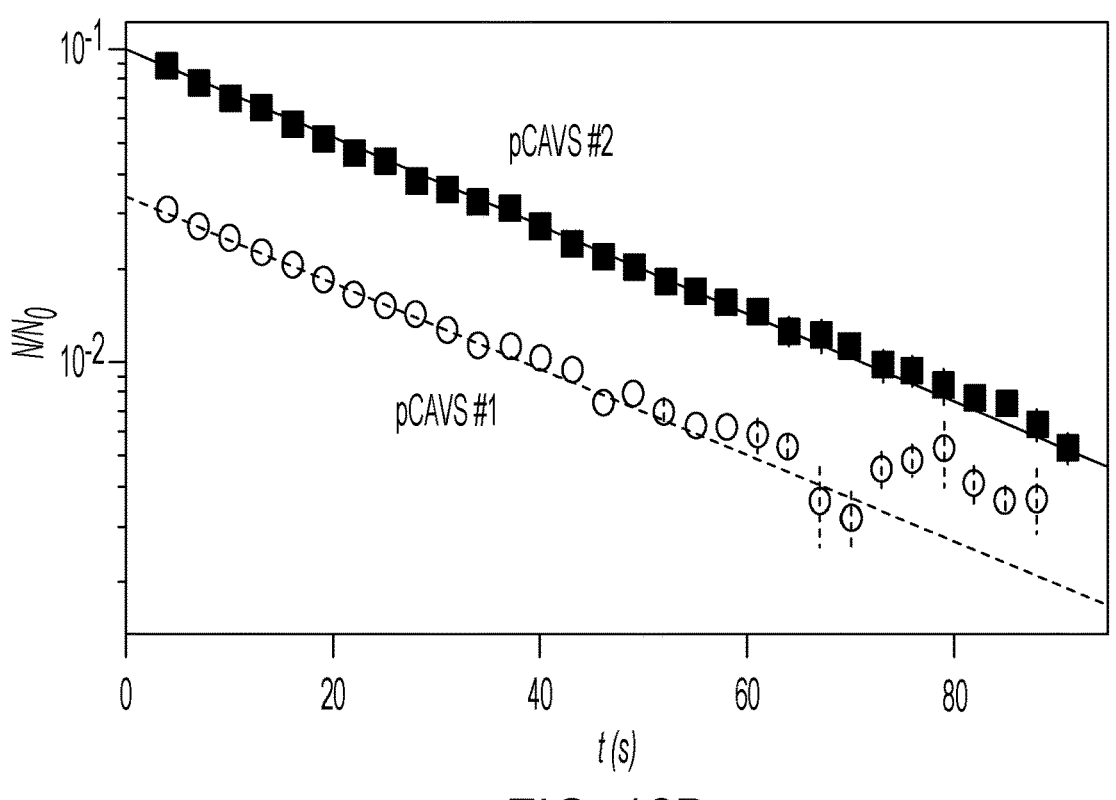

For the data in FIG. 12(b), the measured temperature of the vacuum chamber is 301.7(1.6) K. The standard uncertainty $u(T)$ is a combination of an observed 1.3 K gradient between our two platinum-resistance thermometers, a 0.8 K common drift over the full measurement duration ($\approx$3.5 h), and a small 0.03 K calibration uncertainty. The uncertainty in F is statistical (type-A), and its relative value $u(\nu)/\Gamma=0.022$ and 0.01 for pCAVS #1 and pCAVS #2, respectively. (Any timing uncertainty is negligible at this level of precision.)

Unlike for $K_{H_2}$, no fully quantum mechanical scattering calculation exists for the fraction of glancing collisions $f_{gl}(U)$. However, $f_{gl}(U)$ can be estimated from a semiclassical theory that has as its only molecular input the van-der-Waals coefficient $C_6$ of the attractive long-range dispersion potential between Li and $H_2$. Restating the results of Ref. in terms of length and energy scales for a van-der-Waals potential, we find $$f_{gl}(U) = 0.179 \ldots \times \left(\frac{kT_{eff}}{E_6}\right)^{-1/5} \frac{m_{Li}}{\mu} \frac{U}{E_6} + O(U^2), \tag{2}$$

where length $x_6 = \sqrt{2\mu C_6/\hbar^2}$, energy is the reduced mass of the $^7Li+H_2$ system, and h is the reduced Planck constant. Here, $m_i$ with $i=Li$ and $H_2$ are the masses of $^7Li$ and $H_2$, respectively. The temperature $T_{eff}=m_{Li}T/(m_{Li}+m_{H_2})<T$ is the effective temperature in the relative motion between $^7Li$ and $H_2$ accounting for the very different temperatures of $^7Li$ and $H_2$. We have $E_6/k=80.5$ mK for $^7Li+H_2$ and estimate that the semiclassical theory is accurate to within 50%.

The trap depth U of the quadrupole trap for atoms in the $m_F=-1$ projection state is given by $U=-g_F\mu_B B'z_T$, where g factor $g_F=-0.50$ and $z_T=6.2(1.0)$ mm is the nearest distance to the chip. For our pCAVS systems, $U/k=1.5(3)$ mK, making $f_{gl}=3.2(1.7)\times10^{-3}$. Here, the uncertainty is the uncorrelated combination of the uncertainty of U and our estimate of the accuracy of the semiclassical theory. Only the term shown in Eq. (2), the expansion of $f_{gl}(U)$ in U around $U=0$, is required at our level of precision. We note that had we measured the sensor atom loss rate of the MOT, with its $U\sim k\times1$ K trap depth, we estimate $f_{gl}\sim0.5$ with a similarly large uncertainty. In this case, $u(f_{gl})$ would be the dominant contributor to $u(p)$.

Several sensor atom loss mechanisms contribute to $\Gamma_{other}$. Majorana losses (losses due to non-adiabatic $m_F$ spin flips near the magnetic field zero) have a characteristic timescale of $$\Gamma_{Majorana} \sim \hbar/m_{Li}r_c^2,$$

where $r_c$ is the characteristic size of the cloud. Here, we take $r_c$ to be the 1/e radius of the cloud along the radial direction. For B-field gradient $B'=7.53$ mT/cm and an estimated $^7Li$ temperature of 750 $\mu$K, $r_c\approx6$ mm and we derive that $\Gamma_{Majorana}\approx3.6\times10^{-4}$ $s^{-1}$, 1% of the measured $\Gamma$. The functional form for Majorana loss is unknown (it may be super-exponential) and further study is required. We conservatively assume $\Gamma_{Majorana}=0$ and $u(\sigma_{Majorana})=3.6\times10^{-4}$ $s^{-1}$.

The next largest contribution to $\Gamma_{other}$ is thermalization or evaporative loss (due to elastic collisions between two cold $^7Li$ atoms that cause one atom to be lost from the quadrupole trap). With $10^4$ atoms in the quadrupole trap at 750 $\mu$K, our peak density is of the order of $10^5$ $cm^{-3}$ and evaporative loss rates are $\leq10^{-6}$ $s^{-1}$. Collisions between cold $^7Li$ atoms that induce spin flips or three-body recombination and cause ejection are further suppressed, occurring with rates $<10^{-11}$ $s^{-1}$. Loss due to resonant scattering of blackbody radiation at 300 K is $<10^{-18}$ $s^{-1}$. Even if the temperature of the pCAVS were 500 K, the loss rate due to blackbody radiation is $\approx2\times10^{-4}$ $s^{-1}$. Scattering from blackbody radiation, room lights, or diffuse scattering from the laser source in its light-tight box is negligible. Hence, we take $\Gamma_{other}=0$ and $U(\Gamma_{other})=u(\Gamma_{Majorana})$.

| Contribution/Source | Pressure Independent | Pressure Dependent |
|---|---|---|
| Rate coefficient, $K_{H_2}$ | | 0.019 p |
| Temperature, T | | 0.005 p |
| Glancing fraction, $f_{gl}$ | | $1.7 \times 10^{-3}$ p |
| Majorana losses, $\Gamma_{other}$ | 0.33 nPa | |

-continued

| Contribution/Source | Pressure Independent | Pressure Dependent |
|---|---|---|
| Statistical, Γ | 0.39 nPa | |
| Total Variance | $(0.51 \text{ nPa})^2 +$ | |
| | $(0.020 \text{ p})^2$ | |

The Table includes a one-standard-deviation, k=1 uncertainty budget and total variance of the pressure measured by pCAVS #2 using $^7$Li sensor atoms for the decay shown in FIG. 12(b). Quantity p in the right-most column is the measured pressure in the vacuum chamber; all other symbols correspond to those of Eq. 1. For the total variance the uncertainties are added in quadrature assuming no correlations among the contributions. Here, the summary of the uncertainty budget with its five uncorrelated contributions to the measurement uncertainty of p is shown for the pCAVS #2 with error propagation of the measurement equation 1 and implies that the first three entries of the Table depend on p. In particular, the contribution in quadrature to u(p) from $f_{gl}$ is $|dp/df_{gl}| \times u(f_{gl}) \approx pu(f_{gl})$ because $f_{gl} \ll 1$. The last two entries in the table are independent of p, because u(Γ) and u(Γ$_{other}$) are independent of p, while Γ∝p and Γ$_{other}$=0. Combining all sources of uncertainty in quadrature, we find p=41.5(1.2) nPa and p=42.2(1.0) nPa for pCAVS #1 and pCAVS #2, respectively. The relative uncertainties are 3.0% and 2.5%, respectively. Moreover, the data in Table 1 imply that for p<40 nPa the noise in Γ–Γ$_{other}$ dominates in the uncertainty of p, while for p>40 nPa the uncertainty in loss rate coefficient $K_{H_2}$ is the limiting factor in measuring p. The uncertainty budget for pCAVS #1 is the same as that for pCAVS #2, except for a change in u(Γ) to 0.78 nPa.

At base pressure near 40 nPa, we find that the alkali-metal dispensers (AMDs) affect the pressure in the vacuum chamber. At the 400° C. operating temperature of the AMD, we expect some outgassing from the dispenser. Some fraction of this additional gas load is not pumped away by the NEG, and will escape through the differential pumping tube. The additional gas load will scale exponentially with AMD temperature, which in turn is determined by the balance of electrical power dissipated within the AMD (≈3 W) and the flow of heat out. For our operating temperatures of about 400° C., radiative loss is negligible and the temperature rise of the AMD is proportional to the dissipated power.

Figure 13:
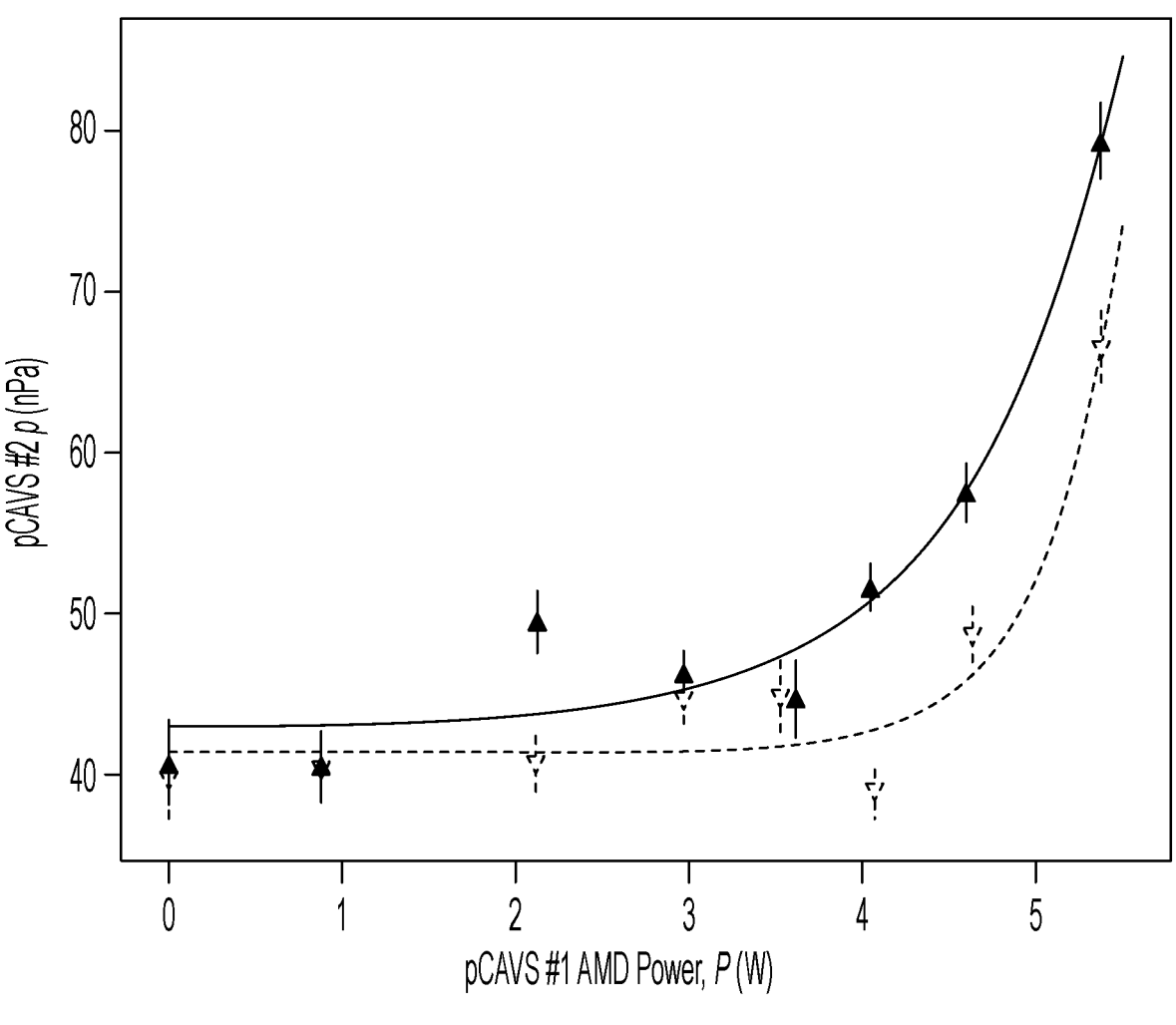
FIG. 13 shows, according to some embodiments, measured pressures p by pCAVS #2 as functions of the power P dissipated in the alkali-metal dispenser (AMD) of pCAVS

We quantify the additional gas load by measuring the chamber pressure p with pCAVS #2 at constant AMD power while varying the AMD power P of pCAVS #1 to determine whether AMD outgassing affects the vacuum. For this set of experiments, no $^7$Li atoms were loaded in pCAVS #1. FIG. 13 shows the result with the pCAVS #1 titanium shutter closed (green downward triangles), which lowers the conductance through the differential pumping tube, and open (purple upward triangles). Both traces show a pressure increase that is exponential with dissipated power P, as expected from the observation that outgassing is exponential in temperature which, in turn, is proportional to P. The pressure data is fit to p=p$_0$+q(P)/S, where power-dependent (additional) outgassing rate q(P)=q$_0$[exp(P/P$_0$)−1] and S=10 L/s, an estimate of the pumping speed to remove gas from pCAVS #1. The fit parameters p$_0$, q$_0$, and P$_0$ correspond to the chamber base pressure, the AMD outgassing rate coefficient, and the activation power for the outgassing process, respectively.

The data sets with the shutter closed and open in FIG. 13 were taken on different days. On these days the base pressure of the vacuum chamber p$_0$ was slightly different due to changes in the laboratory environment. At our typical operating power of 3 W, the resulting outgassing rates q(P) are $2 \times 10^{-8}$ Pa L/s and $1 \times 10^{-9}$ Pa L/s with the shutter open and closed, respectively. The corresponding pressure increases are 2 nPa and 0.1 nPa, respectively. These results suggest that the AMD is the predominant source of additional gas load; future versions of the pCAVS may incorporate a titanium AMD or a pyrolytic graphite dispenser, which have significantly lower outgassing rates compared to commercially available AMDs. The 0.1 nPa increase when the shutter is closed suggests that the AMD is heating the surrounding vacuum components, causing them to outgas, albeit at a considerably smaller rate. Indeed, our thermometers observe an increase of 2 K for every 1 A of additional AMD current i. We conclude that to operate the pCAVS in the XHV regime (<1 nPa) both a better AMD and better thermal management can be used.

Currently, the pCAVS can measure pressure throughout the UHV regime with accuracies ranging from 1% at $10^{-6}$ Pa to ≈30% at $10^{-9}$ Pa. This level of accuracy meets requirements for leak triangulation in the next generation of the gravitational wave detectors and accelerator experiments and makes the pCAVS a good standard for ionization gauge and residual gas analyzer calibrations. Two limitations to operating the current pCAVSs in the XHV regime (<$10^{-9}$ Pa) are due to the uncertainties in Γ$_{Majorana}$ and Γ (see Tab. 1). Here, we have taken a conservative estimate of the uncertainty due to Majorana loss as further modeling is required. Modeling would also determine its time dependence. If this dependence is different from an exponential, it can be separated from the background-gas induced losses. If Majorana loss is both exponential in time and as large as estimated in the Table, future pCAVS designs could incorporate either a quadrupole with a Ioffe configuration (QUIC) trap or a permanent magnet Ioffe-Pritchard trap, which has no magnetic field zero and thus Majorana loss is suppressed.

The type-A statistical uncertainty of F could be improved by more averaging, with the only relevant constraint being total integration time. For example, the traces in FIG. 2(b) required a collection time of roughly 3.5 h in order to achieve a relative uncertainty of u(Γ)/Γ≈0.01. The required integration time scales as the inverse of pressure as p∝Γ. For a pressure of 0.4 nPa, a hundred times better than our current base pressure, the integration time becomes 14 d to achieve the same ≈1% relative uncertainty. Improvements to the pCAVSs could be made by increasing the signal-to-noise ratio N/u(N): we estimate that our current noise level is a factor of three higher than the atom-shot-noise limit. As the integration time also scales as $N^{-1/2}$, loading up to $10^7$ atoms in the MOT, rather than the $10^5$ atoms with the current setup, will reduce the integration time by a factor 10. Such an improvement in atom number could be achieved by better aligning the laser, differential pumping tube, and diffraction grating chip. Together, these improvements could reduce the integration time at lower pressures.

The processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware, or a combination thereof.

Many other variations than those described herein will be apparent from this disclosure. For example, depending on the embodiment, certain acts, events, or functions of any of the algorithms described herein can be performed in a different sequence, can be added, merged, or left out alto- gether (e.g., not all described acts or events are necessary for the practice of the algorithms). Moreover, in certain embodi- ments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Any logical blocks, modules, and algorithm elements described or used in connection with the embodiments disclosed herein can be implemented as electronic hardware, computer software, or combinations of both. To clearly illustrate this interchangeability of hardware and software, various illustrative components, blocks, modules, and ele- ments have been described above generally in terms of their functionality. Whether such functionality is implemented as hardware or software depends upon the particular applica- tion and design constraints imposed on the overall system. The described functionality can be implemented in varying ways for each particular application, but such implementa- tion decisions should not be interpreted as causing a depar- ture from the scope of the disclosure.

The various illustrative logical blocks and modules described or used in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process com- puter-executable instructions. In another embodiment, a processor includes an FPGA or other programmable device that performs logic operations without processing computer- executable instructions. A processor can also be imple- mented as a combination of computing devices, e.g., a combination of a DSP and a microprocessor, a plurality of microprocessors, one or more microprocessors in conjunc- tion with a DSP core, or any other such configuration. Although described herein primarily with respect to digital technology, a processor may also include primarily analog components. For example, some or all of the signal pro- cessing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable stor- age medium, media, or physical computer storage known in the art. An example storage medium can be coupled to the processor such that the processor can read information from, and write information to, the storage medium. In the alter- native, the storage medium can be integral to the processor. The storage medium can be volatile or nonvolatile.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combi- nation comprising at least one of the named constituents, components, compounds, or elements, optionally together with one or more of the same class of constituents, compo- nents, compounds, or elements.

All references are incorporated herein by reference.

The use of the terms "a," "an," and "the" and similar referents in the context of describing the invention (espe- cially in the context of the following claims) are to be construed to cover both the singular and the plural, unless otherwise indicated herein or clearly contradicted by con- text. It can further be noted that the terms first, second, primary, secondary, and the like herein do not denote any order, quantity, or importance, but rather are used to distin- guish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunc- tion or is used to link objects of a list or alternatives and is not disjunctive, rather the elements can be used separately or can be combined together under appropriate circumstances.

What is claimed is:

1. A photonically multiplexed optical measurement appa- ratus for performing optical multiplexing, the photonically multiplexed optical measurement apparatus comprising:

a first laser that produces first laser light and communi- cates the first laser light to a first optical switch;

the first optical switch in optical communication with the first laser and that:
receives the first laser light from the first laser,
produces a first switched laser light from the first laser light with the first optical switch in a first switch state,
communicates the first switched laser light to a first sensor head during the first switch state,
switches from the first switch state to a second switch state,
produces a second switched laser light from the first laser light with the first optical switch in a second switch state, and
communicates the second switched laser light to a second sensor head during the second switch state,
such that the first optical switch optically switches the first laser light from the first laser to a selected sensor head and subsequently to a different sensor head; and
a plurality of sensor heads, each sensor head being configured to measure a respective physical property of a plurality of cold atoms disposed in the sensor head, such that the plurality of sensor heads comprises the first sensor head and the second sensor head,
wherein the second switched laser light is used for at least one of cooling, trapping, or probing the plurality of cold atoms.

2. The photonically multiplexed optical measurement apparatus of claim 1, further comprising a control unit that:
receives a plurality of measurement signals from the plurality of sensor heads in response to individual sensor heads receiving the switched laser light;
controls, by a control signal, the first optical switch to optically switch the first laser light from the first laser to the selected sensor head in accordance with the plurality of measurement signals;
measures the respective physical property of the selected sensor head using the switched laser light; and
generates a plurality of measurement outputs based on the measured physical properties.

3. The photonically multiplexed optical measurement apparatus of claim 1, further comprising:
a second laser in optical communication with the first optical switch and that produces and communicates second laser light to the first optical switch; and
an optical splitter optically interposed between the first laser and the first optical switch and optically interposed between the second optical switch and the first optical switch,
such that the optical splitter:
receives the first laser light from the first laser and the second laser light from the second laser, and
communicates the first laser light and the second laser light to the first optical switch,
wherein the first optical switch:
receives the first and second laser lights from the optical splitter,
produces the first switched laser light comprising the first and second laser lights with the optical switch in the first switch state,
communicates the first switched laser light to the first sensor head during the first switch state,
switches from the first switch state to the second switch state,
produces the second switched laser light comprising the first and second laser lights with the optical switch in the second switch state, and communicates the second switched laser light to the second sensor head during the second switch state.

4. The photonically multiplexed optical measurement apparatus of claim 3, further comprising:
a second optical switch in optical communication with the optical splitter, such that the optical splitter communicates the first laser light and the second laser light to the second optical switch, and the second optical switch:
receives the first and second laser lights from the optical splitter,
produces a plurality of switched laser lights comprising the first and second laser lights,
communicates the individual switched laser lights to each sensor head of a second plurlaity of sensor head during separate switch states of the second optical switch in response to switching among the separate switch states; and
the second plurality of sensor heads, each sensor head being configured to measure a respective physical property of a plurality of cold atoms disposed in the sensor head.

5. The photonically multiplexed optical measurement apparatus of claim 3, further comprising:
a second optical switch in optical communication with a third laser and the plurality of sensor heads, such that that second optical switch:
receives a third laser light from the third laser,
produces a second plurality of switched laser lights comprising the third laser light, and
communicates the individual switched laser lights of the second plurality of switched laser lights to each sensor head of the plurlaity of sensor heads during separate switch states of the second optical switch in response to switching among the separate switch states,
wherein each sensor head, individually and during a spearate time associated with the switch states of the second optical switch, receives a separate switched laser light of the second plurality of switched laser lights and measures the respective physical property of the plurality of cold atoms disposed in the sensor head through receiving a combination of switched laser lights from the first optical switch and the second optical switch.

6. The photonically multiplexed optical measurement apparatus of claim 1, wherein the plurality of sensor heads are configured to measure different physical properties.

7. The photonically multiplexed optical measurement apparatus of claim 1, wherein the plurality of sensor heads are configured to measure the same physical property.

8. The photonically multiplexed optical measurement apparatus of claim 1, wherein the sensor heads are multiplexed in time.

9. The photonically multiplexed optical measurement apparatus of claim 1, wherein the sensor heads are multiplexed in wavelength.

10. The photonically multiplexed optical measurement apparatus of claim 1, wherein the sensor heads comprise an atom interferometer, a vacuum pressure sensor, an inertial sensor, an optical clock, a microwave clock, or a combination comprising at least one of the foregoing sensor heads.

11. The photonically multiplexed optical measurement apparatus of claim 1, wherein the photonically multiplexed optical measurement apparatus is configured to measure a property of cold atoms that is a function of time or that is a function of wavelength.

12. The method of claim 1, wherein the optical switch is an acousto-optic modulators, an electro-optic modulator, or a liquid crystal modulator.

13. The process of claim 1, wherein the property of cold atoms is vacuum pressure, inertial forces, gravitational acceleration, time, or frequency.

14. The process of claim 1, wherein the step of selecting a sensor head is performed in a time-division multiplexing scheme or in a wavelength-division multiplexing scheme.

15. The process of claim 1, wherein the step of measuring the property of cold atoms is performed by detecting the light that is scattered from the cold atoms.

16. The process of claim 4, wherein the step of measuring the property of cold atoms is performed by detecting an absorption of light by the cold atoms.

17. The process of claim 4, wherein the step of measuring the property of cold atoms is performed by detecting fluorescence of the cold atoms.

18. The process of claim 4, wherein the step of measuring the property of cold atoms is performed by detecting ionization of the cold atoms.

19. A photonically multiplexed optical measurement apparatus comprising:

a laser for producing laser light;

an optical switch in optical communication with the laser and configured to optically switch the laser light to a selected sensor head;

a plurality of sensor heads, each sensor head being configured to measure a respective physical property of a plurality of cold atoms disposed in the sensor head; and a controller configured to control the optical switch to optically switch the laser light to the plurality of sensor heads in a sequence.

20. A process of operating a photonically multiplexed optical measurement apparatus, comprising the steps of:

providing a photonically multiplexed optical measurement apparatus comprising:

a laser for producing laser light;

an optical switch in optical communication with the laser and configured to optically switch the laser light to a selected sensor head;

a plurality of sensor heads, each sensor head being configured to measure a respective physical property of a plurality of cold atoms disposed in the sensor head; and a controller configured to control the optical switch to optically switch the laser light to the plurality of sensor heads in a sequence;

selecting a sensor head from the plurality of sensor heads;

providing, by the optical switch, switched laser light to the selected sensor head;

measuring the property of cold atoms using the selected sensor head; and turning off, by the optical switch, the switched laser light to the selected sensor head.

\* \* \* \* \*